(12) United States Patent
Gardner et al.

(10) Patent No.: US 12,276,364 B2
(45) Date of Patent: *Apr. 15, 2025

(54) QUICK-CONNECT FITTING

(71) Applicant: Mercury Plastics LLC, Middlefield, OH (US)

(72) Inventors: Scott Raymond Gardner, Chagrin Falls, OH (US); Earl Christian, Chagrin Falls, OH (US); Donald Currey, Chagrin Falls, OH (US); Grandin Rushlander, Mantua, OH (US); Jay Burnett, Middlefield, OH (US)

(73) Assignee: Mercury Plastics LLC, Middlefield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,238

(22) Filed: Feb. 7, 2024

(65) Prior Publication Data

US 2024/0175530 A1 May 30, 2024

Related U.S. Application Data

(63) Continuation of application No. 17/319,675, filed on May 13, 2021, now Pat. No. 11,898,676.

(60) Provisional application No. 63/024,130, filed on May 13, 2020.

(51) Int. Cl.
*F16L 37/14* (2006.01)
(52) U.S. Cl.
CPC .................................. *F16L 37/144* (2013.01)
(58) Field of Classification Search
CPC ... F16L 37/12; F16L 37/1225; F16L 37/0841; F16L 37/098; F16L 37/0985

USPC ......................................................... 285/305
See application file for complete search history.

(56) References Cited

U.S. PATENT DOCUMENTS

| | | | |
|---|---|---|---|
| 1,436,882 A | 11/1922 | Bippus |
| 1,458,337 A | 6/1923 | Grier |
| 1,483,268 A | 2/1924 | Baldauf |
| 1,850,879 A | 3/1932 | Hunt |
| 2,021,241 A | 11/1935 | Mall |
| 2,281,633 A | 5/1942 | Stitzer |
| 2,497,273 A | 2/1950 | Richardson |
| 2,520,215 A | 8/1950 | Kerr |

(Continued)

FOREIGN PATENT DOCUMENTS

| | | |
|---|---|---|
| DE | 102014226395 | 6/2016 |
| FR | 2729453 | 7/1996 |

(Continued)

OTHER PUBLICATIONS

US 5,495,274 A, 03/1996, Graves et al. (withdrawn)

(Continued)

*Primary Examiner* — Aaron M Dunwoody
(74) *Attorney, Agent, or Firm* — Bose McKinney & Evans LLP

(57) ABSTRACT

A quick-connect fitting that provides a leak-proof connection between two components of a waterway. The quick-connect fitting of the present disclosure is releasable and reusable for disconnecting and reconnecting the waterway connection. Moreover, the quick-connect fitting further comprises an audible identifier which identifies the quick-connect fitting has secured the waterway components to be connected.

18 Claims, 24 Drawing Sheets

(56) References Cited

U.S. PATENT DOCUMENTS

| | | |
|---|---|---|
| 3,220,126 A | 11/1965 | Gabrielsen |
| 3,278,205 A | 10/1966 | Barlow |
| 3,325,192 A | 6/1967 | Sullivan |
| 3,753,582 A | 8/1973 | Graham |
| 3,830,525 A | 8/1974 | Ransford, III |
| 4,032,177 A | 6/1977 | Anderson |
| 4,068,870 A | 1/1978 | Whitney et al. |
| 4,230,345 A | 10/1980 | Boelkins |
| 4,458,719 A | 7/1984 | Strybel |
| 4,616,859 A | 10/1986 | Brunet |
| 4,691,726 A | 9/1987 | Studer et al. |
| 5,074,332 A | 12/1991 | Jones |
| 5,104,158 A | 4/1992 | Meyer et al. |
| 5,131,687 A | 7/1992 | Marchou |
| 5,156,421 A | 10/1992 | Chauvel |
| 5,248,306 A | 9/1993 | Clark et al. |
| 5,309,609 A | 5/1994 | Janiszewski |
| 5,330,235 A | 7/1994 | Wagner et al. |
| 5,395,140 A | 3/1995 | Wiethorn |
| 5,401,065 A | 3/1995 | Okumura et al. |
| 5,437,648 A | 8/1995 | Graves et al. |
| 5,447,337 A | 9/1995 | Ruckwardt |
| 5,628,531 A | 5/1997 | Rosenberg et al. |
| 5,797,634 A | 9/1998 | Bonser |
| 6,089,616 A | 7/2000 | Trede et al. |
| 6,096,024 A | 8/2000 | Graves et al. |
| 6,220,859 B1 | 4/2001 | Hoffman |
| 6,422,607 B1 | 7/2002 | Kirby |
| 6,447,017 B1 | 9/2002 | Gilbreath et al. |
| 6,499,772 B1 | 12/2002 | Minemyer |
| 6,554,320 B2 | 4/2003 | Cresswell |
| 6,672,628 B2 | 1/2004 | Thomas et al. |
| 6,672,792 B1 | 1/2004 | Schipani et al. |
| 6,983,958 B2 | 1/2006 | Rautureau |
| 7,128,347 B2 | 10/2006 | Kerin |
| 7,547,048 B2 | 6/2009 | Catlow |
| 7,658,420 B2 | 2/2010 | Harger et al. |
| 7,681,327 B2 | 3/2010 | Koljonen et al. |
| 7,766,043 B2 | 8/2010 | Thomas et al. |
| 7,819,137 B2 | 10/2010 | Nelson et al. |
| 7,850,898 B1 | 12/2010 | Rowley et al. |
| 7,891,382 B2 | 2/2011 | Rushlander et al. |
| 7,891,973 B2 | 2/2011 | Lenoir |
| 7,927,534 B1 | 4/2011 | Semen, Sr. et al. |
| 8,038,180 B2 | 10/2011 | Williams et al. |
| 8,277,714 B1 | 10/2012 | Blue et al. |
| 8,329,088 B1 | 12/2012 | Rowley et al. |
| 8,337,738 B1 | 12/2012 | Seman, Sr. et al. |
| 8,434,407 B2 | 1/2013 | Seman, Sr. et al. |
| 8,365,770 B2 | 2/2013 | Thomas et al. |
| 8,431,067 B2 | 4/2013 | Rowley et al. |
| 8,454,874 B2 | 6/2013 | Rushlander et al. |
| 8,646,476 B2 | 2/2014 | Thomas et al. |
| 8,740,256 B2 | 6/2014 | Fansler et al. |
| 8,789,854 B2 | 7/2014 | Christian et al. |
| 8,973,952 B2 * | 3/2015 | Nishino ............ F16L 37/1225 285/305 |
| 9,103,478 B2 | 8/2015 | Christian |
| 9,657,879 B1 | 5/2017 | Currey |
| 10,012,335 B2 | 7/2018 | Dude |
| 10,082,232 B2 | 9/2018 | Christian, Jr. et al. |
| 10,247,343 B2 | 4/2019 | Dornhofer et al. |
| 10,422,459 B2 | 9/2019 | Jones et al. |
| 2003/0052484 A1 | 3/2003 | Rautureau |
| 2004/0051313 A1 | 3/2004 | Trouyet |
| 2004/0178629 A1 | 9/2004 | Yoshida |
| 2005/0161942 A1 | 7/2005 | Takayanagi |
| 2007/0132235 A1 | 6/2007 | Jones |
| 2008/0315576 A1 | 12/2008 | Moretti et al. |
| 2009/0102188 A1 | 4/2009 | Ishiki |
| 2010/0148497 A1 | 6/2010 | Kaneda |
| 2010/0191193 A1 | 7/2010 | Pajunk |
| 2011/0180158 A1 | 7/2011 | Arcati |
| 2016/0230913 A1 | 8/2016 | Hatanaka |
| 2017/0114937 A1 | 4/2017 | Bippus |
| 2019/0234547 A1 | 8/2019 | Gauthier |

FOREIGN PATENT DOCUMENTS

| | | |
|---|---|---|
| GB | 602737 | 2/1942 |
| GB | 1365815 | 9/1974 |
| KR | 100913001 | 8/2009 |
| WO | WO 2011080717 | 7/2011 |

OTHER PUBLICATIONS

Quick Diconnect Couplings & Inserts, United States Plastic Corp., online product catalog (https://www. usplastic.com/catalog/default. aspx?catid=743), retrieved on Aug. 16, 2021.

* cited by examiner

QUICK-CONNECT FITTING

CROSS-REFERENCE TO RELATED APPLICATION

The application is a continuation of U.S. patent application Ser. No. 17/319,675, filed May 13, 2021, which claims priority to U.S. Provisional Patent Application Ser. No. 63/024,130, filed May 13, 2020, the entireties of both of which are expressly incorporated herein by reference.

BACKGROUND

For certain appliance and plumbing applications, it is desired to connect a tube to a second part, where the second part may be a water source, a water dispensing apparatus, a filtering apparatus, another tube, or other part or assembly. For example, a refrigerator door contains a water and/or ice dispenser that receives water by way of a tube through the hinge. In order to facilitate assembly and removal of the refrigerator door, a section of the tube was installed in the door, and a waterway connector was placed near the hinge to enable the tube to be connected to, and disconnected from, another tube extending from the water source.

In the past, waterway connections were often press-fit into the end of the tube. The waterway connections included features that locked or threaded together to make a connection. In many waterway applications, leak-proof connections were desired, and certain prior connections were provided to ensure a suitable seal. However, to provide a suitable seal, such connections were connected so securely that they were difficult to disconnect when service or disassembly was needed. Other prior connections were easy to disconnect but enabled inadvertent loosening or separation and could not be used in applications where leak-proof connections were desired. Additionally, many such connections were disassembled by a consumer, for example to remove a refrigerator door to facilitate moving the appliance. Consumers found disassembly of the prior connections difficult, and frequently failed to reassemble the prior connections properly, thus, enabling leaks in the connections. Consumer disassembly of prior waterway connections resulted in increased repair calls and consumer dissatisfaction with the difficulty of the proper disassembly and reassembly. There remains a need for a quick-connect fitting that solves these and other problems in the prior art.

SUMMARY

The disclosure herein relates to a quick-connect fitting that provides a leak-proof connection between two components of a waterway. The quick-connect fitting of the present disclosure is releasable and reusable for disconnecting and reconnecting the waterway connection. Moreover, the quick-connect fitting further comprises an audible identifier which identifies the quick-connect fitting has secured the waterway components to be connected.

Disclosed herein is a waterway connection assembly for forming a leak-proof connection. The waterway connection assembly comprises a male fitting, a female fitting, and a clip. The male fitting comprises a recess. In some examples, the recess of the male fitting is formed between collars extending from a sidewall of the male fitting. In some examples, the recess of the male fitting may be formed into the sidewall of the male fitting. The female fitting comprises a saddle and a first aperture and a second aperture within opposing sidewalls of the female fitting. The clip comprises a first leg and a second leg. The first leg comprises a first leg protrusion and a first tab and the second leg may additionally comprise a second leg protrusion. The first tab extends from a base of the first leg in an axial direction. The clip may be positioned about the female fitting with the seat positioned at the saddle and the first leg and the second leg extending about the saddle into the first aperture and the second aperture, respectively. The first leg protrusion and the second leg protrusion extend from the first leg and the second leg through the first aperture and the second aperture, respectively. A sidewall of the male fitting is configured to drive the first leg protrusion and the second leg protrusion apart to advance the male fitting into the female fitting. The first leg protrusion and the second leg protrusion snap towards each other into the recess of the male fitting upon fully advancing the male fitting into the female fitting. The waterway connection assembly may additionally, or alternatively, be referred to as comprising a quick-connect fitting and/or may be referred as a leak-proof connection between waterway components.

In some examples, the first tab is configured to travel about an exterior of the first sidewall of the opposing sidewalls of the female fitting as the first leg and the second leg are moved into position overtop the respective first aperture and the second aperture. In one example, a section of the opposing sidewalls separates the saddle from the respective first locking recess and/or second locking recess, as discussed further below. The sidewall may be a surface spanning between the saddle and the respective first locking recess and/or second locking recess, as also discussed further below. The first tab enters into a first locking recess extending into the body of the female fitting at a base of the first aperture in the axial direction. In some examples, the claim may further comprise a second tab extending from a base of the second leg in the axial direction. The second tab may additionally, or alternatively, be configured to travel about an exterior of the second sidewall of the opposing sidewalls of the female fitting as the first leg and the second leg are moved into position overtop the respective first aperture and the second aperture. The second tab enters into a second locking recess extending into the body of the female fitting at a base of the second aperture in the axial direction. In an example, the first tab and the second tab are configured to be forced about the opposing sidewalls of the female fitting and bias the exterior of the opposing sidewalls of the female fitting adjacent the respective first aperture and the second aperture of the female fitting.

In examples of the waterway connection assembly, the clip snaps within the first aperture from a raised position and is configured to make an audible click when the first protrusion enters the recess of the male fitting. Additionally, or alternatively, the clip may be configured to make an audible click when the second protrusion enters the recess of the male fitting. Moreover, an audible click may additionally, or alternatively, be created when the first tab and/or the second tab enter the first locking recess and/or the second locking recess, respectively.

The first aperture and/or the second aperture may further comprise respective bases (e.g., a base of the first aperture and/or a base of the second aperture). In an example, the base of the first aperture and/or the base of the second aperture widen outwardly, or taper, in a radial direction, relative to the female fitting. A base of the first leg and/or a base of the second leg may each have an opposing tapered surface, relative the base of the first aperture and/or the base of the second aperture, respectively. The opposing tapered surfaces of the first leg and the second leg bias the respective widening, or tapered, bases of the first aperture and second aperture, respectively. The tapered surfaces of the first leg and/or the second leg that bias the respective bases of the first aperture and/or the second aperture may slide across one another to spread the first leg from the second leg and away from the male fitting as the seat of the clip is forced into the saddle. Upon the clip being fully seated into the saddle of the female fitting, the first leg protrusion and the second leg protrusion may exit the recess of the male fitting while the first tab is maintained within the first locking recess. The base of the first aperture may additionally extend onto the first locking recess and the respective tapered surface of the first leg may, likewise, additionally extend onto the first tab of the first leg. The respective tapered surface of the first leg may additionally, or alternatively, extend onto the first leg protrusion. The same arrangements may additionally, or alternatively, be provided at the second aperture, the second leg, the second tab, the second leg protrusion, and/or the like.

In examples, the first and second leg of the clip are maintained in, or are drawn into, a parallel arrangement and remain positioned within the recess of the male fitting upon being positioned within the first locking recess. The clip may be u-shaped. The clip may be symmetrical about a plane dividing the first leg from the second leg. The clip may be a polymer. The parallel arrangement may be maintained by shape memory of the polymer. In examples, the first leg and the second leg of the clip are configured to be moved from the parallel arrangement by forcing the seat into the saddle. The first leg and the second leg spread apart and the first leg and the second leg are removed from the recess of the male fitting, releasing the male fitting from the female fitting while the first tab is maintained within the first locking recess. Otherwise, a gap may be maintained between the seat and the saddle when the first leg and the second leg are in a parallel arrangement. In specific examples, the waterway connection assembly does not otherwise include a spring.

Also disclosed herein are methods for securing and/or unsecuring a waterway connection assembly. A method for securing and/or unsecuring a waterway connection assembly may comprise the steps of:
a) sliding a clip about a perimeter of the female fitting where the clip comprises a first leg and a second leg extending from a seat where a first tab extends from a base of the first leg in an axial direction of the female fitting and is maintained about the exterior of the female fitting and spreads the first leg and the second leg apart about the female fitting until a first protrusion of the first leg and a second protrusion of the second leg drop into a respective first aperture and a second aperture on opposing sidewalls of the female fitting; and/or
b) inserting a male fitting into a female fitting and spreading, or respreading, the first leg and the second leg apart by driving the male fitting between the first protrusion of the first leg and the second protrusions of the second leg, where the first protrusion of the first leg and the second protrusion of the second leg snap into the recess of the male fitting while the first protrusion and the second protrusion are maintained within the first aperture and the second aperture, respectively, of the female fitting.

The methods for securing and/or unsecuring a waterway connection assembly may further comprise the steps of (independently or in combination):
c) snapping the first tab into a locking recess of the female fitting when the first protrusion of the first leg and the second protrusion of the second leg drop into the recess of the male fitting and secure the male fitting to the female fitting; and/or
d) driving the seat of the clip into a saddle of the female fitting where, upon driving the seat of the clip toward the saddle of the female fitting, a tapered surface of the first leg and/or a tapered surface of the second leg bias a respective opposing surface of the first aperture and/or the second aperture and the tapered surface of the first leg and/or the tapered surface of the second leg are driven along the respective opposing surfaces of the first aperture and/or the second aperture and spread the first leg and the second leg apart from the recess of the male fitting while maintaining the first protrusion and/or the second protrusion within the respective first aperture and/or the second aperture of the female fitting.

In some examples a second tab may additionally extend from a base of the second leg in an axial direction of the female fitting and operate in similar fashion as the first tab with respect to an opposing sidewall of the female fitting. Additional method steps are contemplated herein as further described below.

Additional features and advantages of the present invention will become apparent of those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
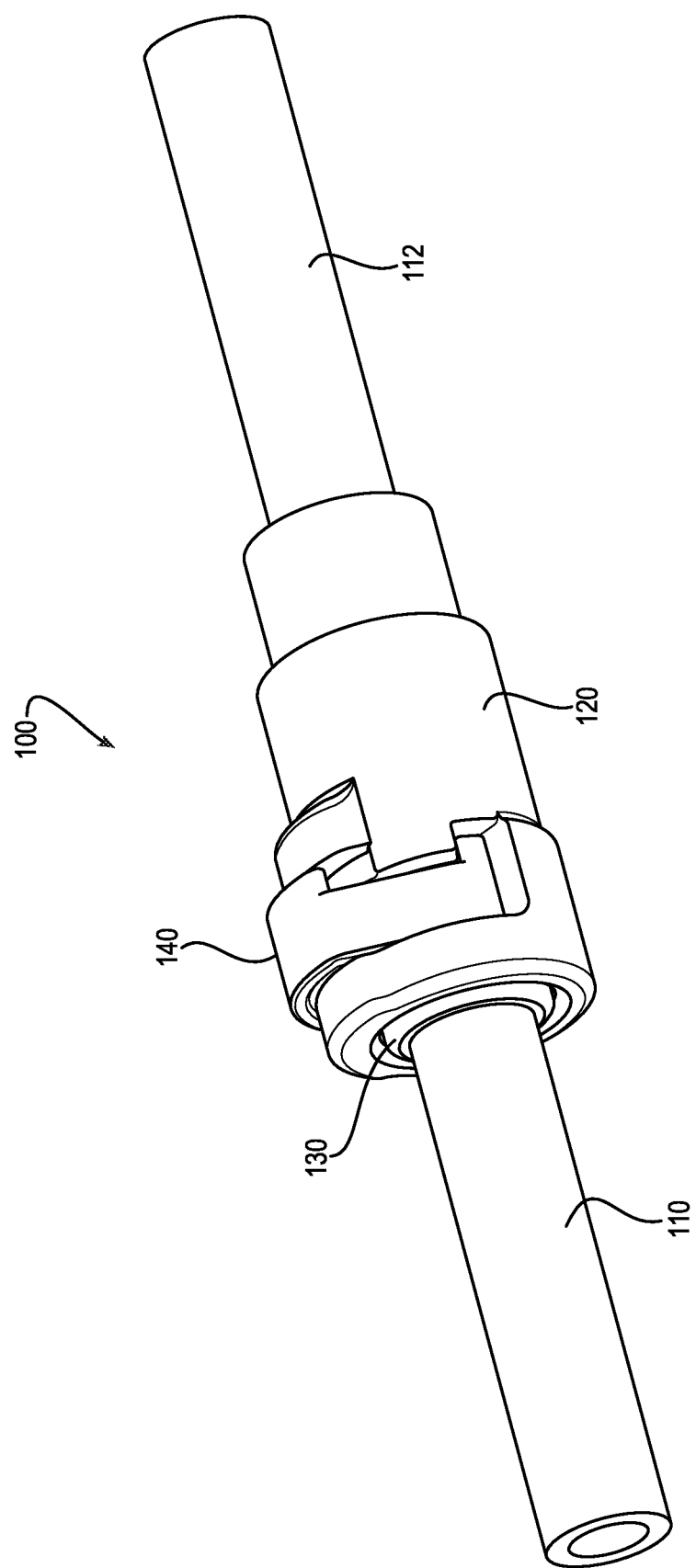
FIG. 1 is a perspective view of a quick-connect fitting, in accordance with an example of the disclosure.

For the purposes of promoting and understanding the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 4:
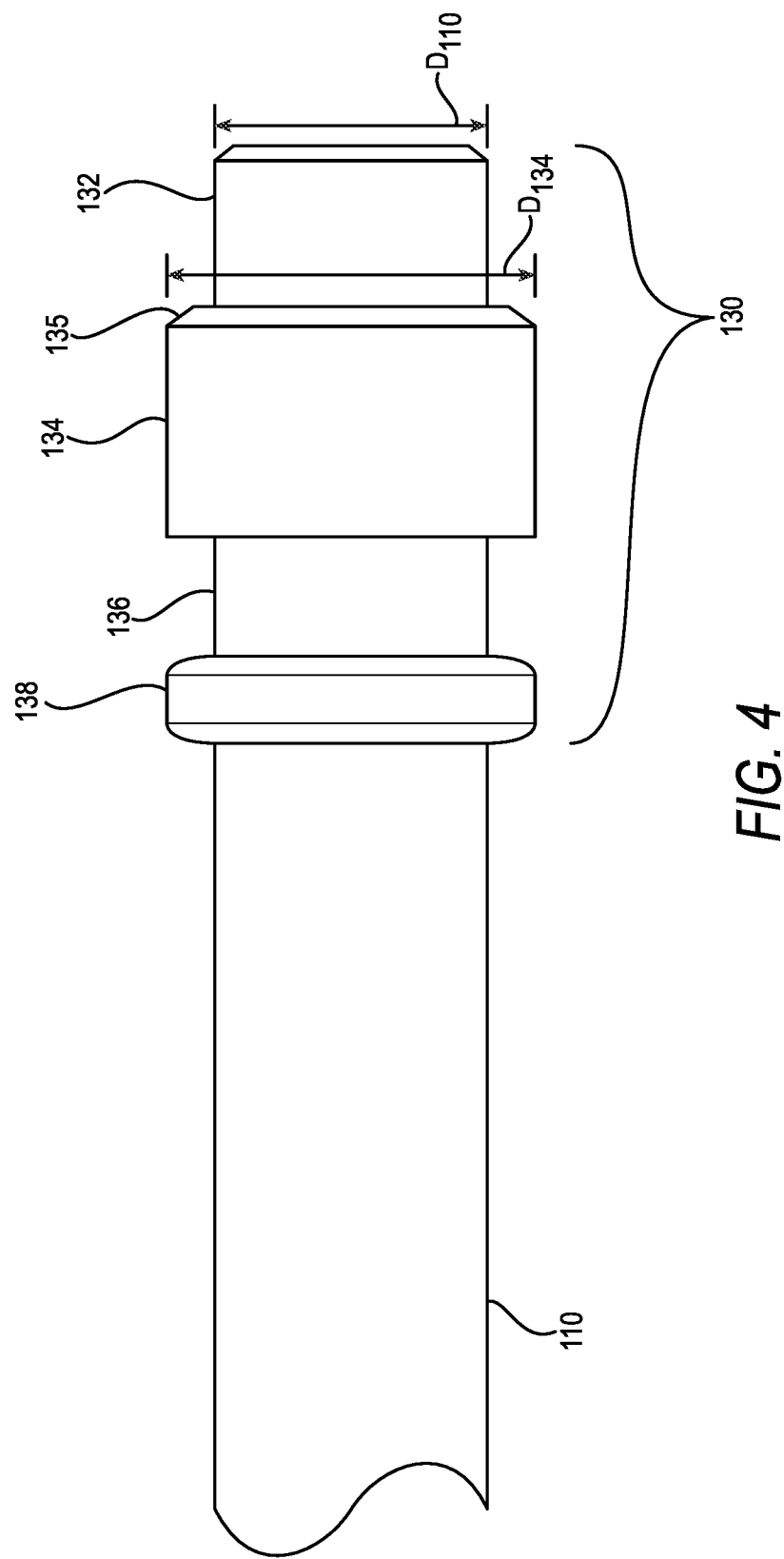
FIG. 4 is a side view of a male fitting of the quick-connect fitting, in accordance with an example of the disclosure.

Referring now to FIG. 1, a quick-connect fitting 100 of one example of the present disclosure includes a male fitting 130 and female fitting 120. A clip 140 is provided to secure the male fitting 130 to the female fitting 120. The male fitting 130, as best illustrated by FIG. 4, is an extension of, or is a component of, a first tube 110. The male fitting 130 may comprise a recess 136 (as illustrated by FIG. 4) for engaging the clip 140 when the clip 140 is positioned within both the female fitting 120 and the male fitting 130, so to secure the female fitting 120 and the male fitting 130 together. The male fitting 130 or the female fitting 120 may be polymeric fittings overmolded onto a first tube 110 and a second tube 112, respectively. The first tube 110 and the second tube 112 may be polymeric tubes that may be formed by extrusion. It is contemplated that one or both of the tubes 110, 112 and/or one or both of the male fitting 130 and female fitting 120, independently or in combination, may be injection molded for certain applications in which the tube length and shape is suited for injection molding. In one specific example, the first tube 110 and the second tube 112 are crosslinked high density polyethylene.

Figure 2:
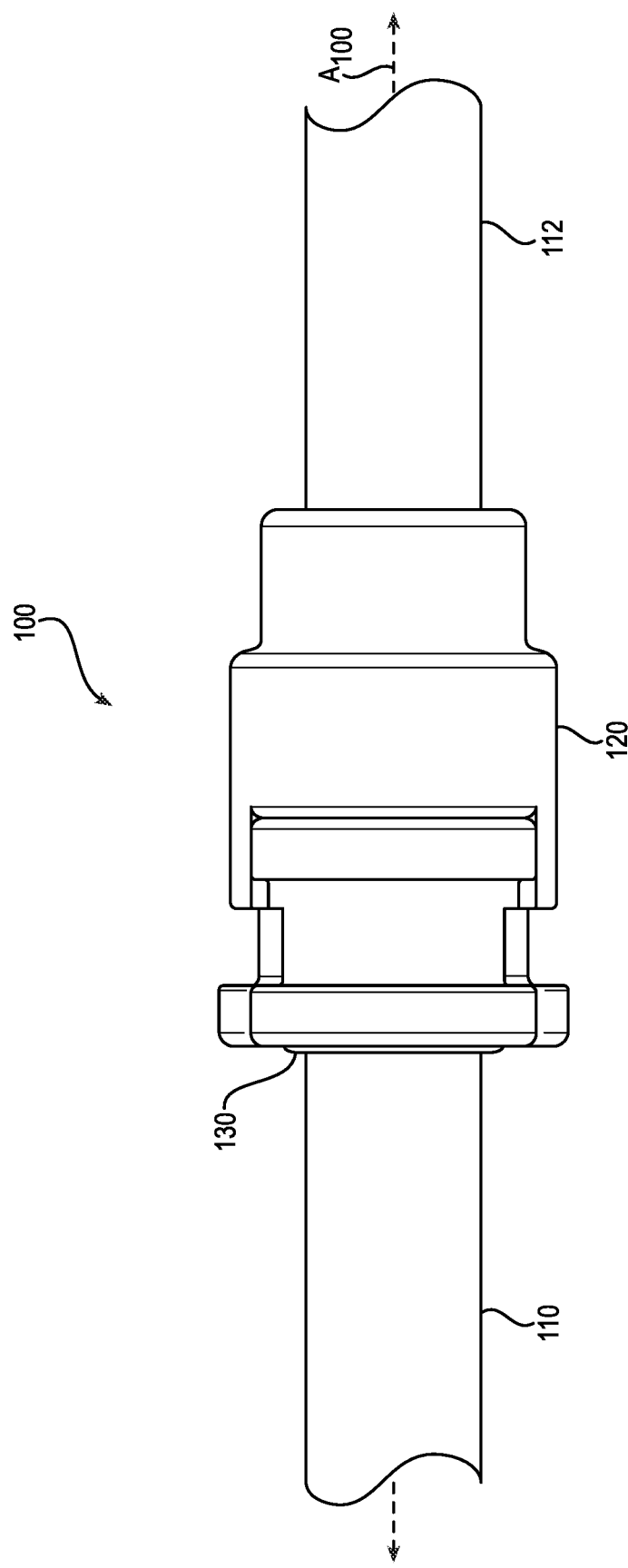
FIG. 2 is a top view of the quick-connect fitting of FIG. 1, in accordance with an example of the disclosure.
Figure 3:
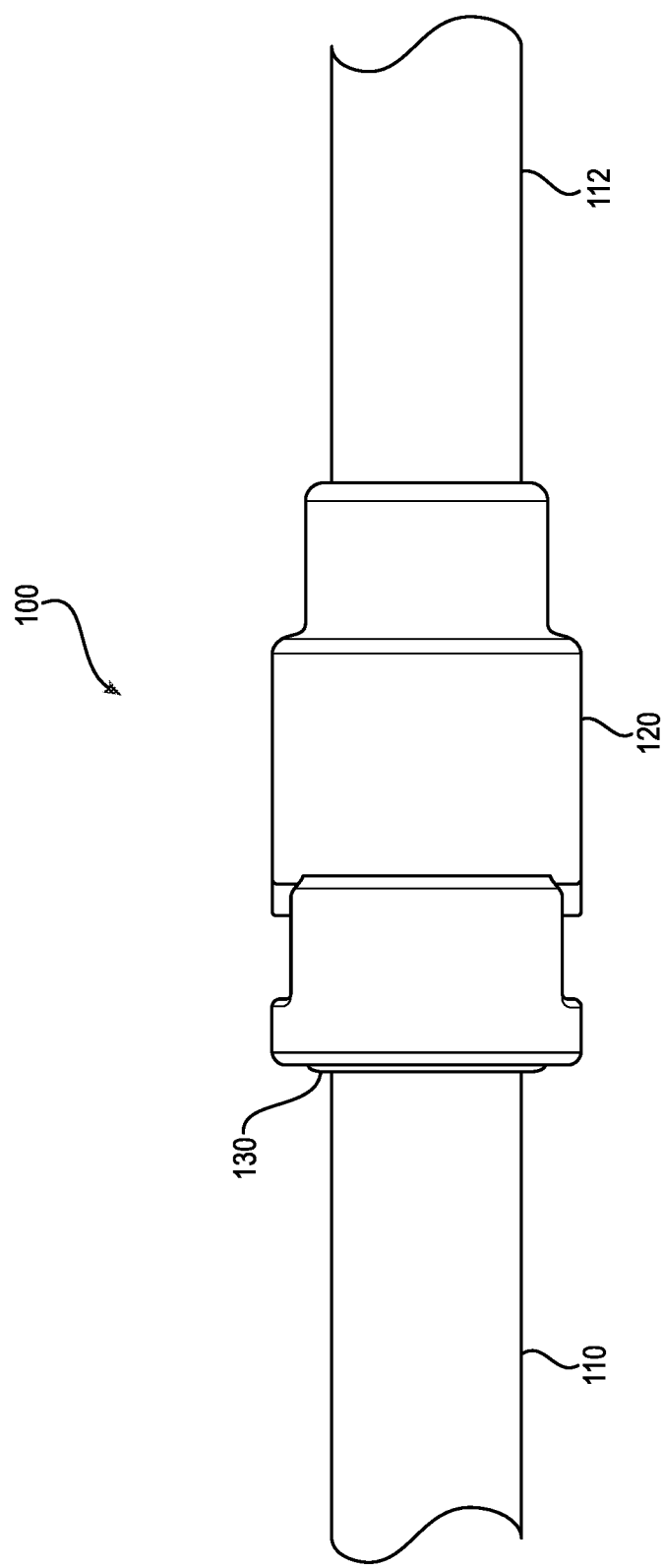
FIG. 3 is a bottom view of the quick-connect tube fitting of FIG. 1, in accordance with an example of the disclosure.
Figure 7:
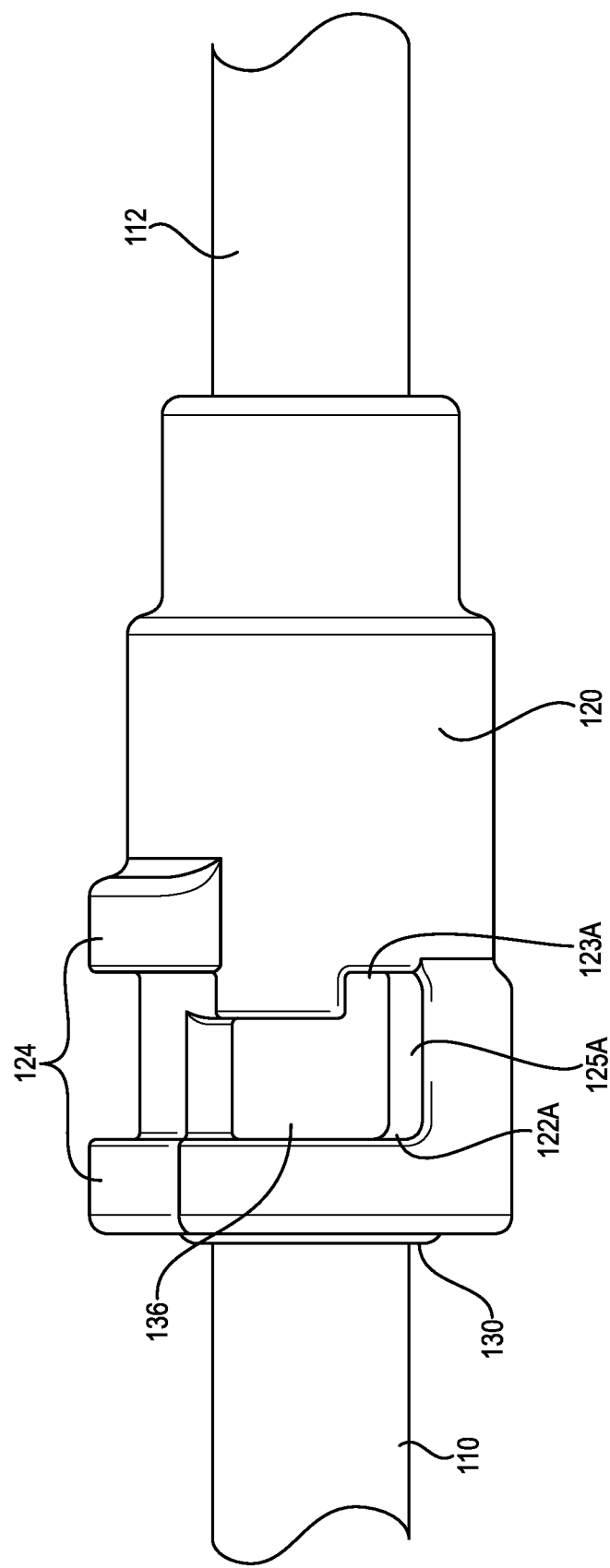
FIG. 7 is a side view of the male and female fittings of the quick-connect fitting, in accordance with an example of the disclosure.

FIG. 2 illustrates a top side view, or saddle side view, of the quick-connect fitting 100 of FIG. 1, with the male fitting 130 inserted into the female fitting 120 such that a first tube 110 is an extension of the second tube 112 in an axial direction Arno. The male fitting 130 and female fitting 120 of FIG. 2 are illustrated without the clip 140, as otherwise illustrated by FIG. 1. FIG. 3 illustrates a bottom side view of the quick-connect fitting 100 of FIG. 2 without the clip 140, as otherwise illustrated by FIG. 1. FIG. 7 illustrates a side view of the quick-connect fitting 100 of FIG. 2 without the clip 140, as otherwise illustrated by FIG. 1. As illustrated by FIGS. 2-3 and 7 the male fitting 130 may be inserted into the female fitting 120 in the absence of the clip 140. In this example, after the male fitting 130 and female fitting 120 are first properly positioned relative to one another, the clip 140, as illustrated by FIG. 1, is forced to travel about the exterior of the female fitting 120 from the top side, or saddle side, of the female fitting 120 until it audibly snaps, or audibly clicks, into position within the apertures 122A, 122B of the female fitting 120 from a raised, or elevated, position in combination with being positioned within the recess 136 of the male fitting 130, as further described below with respect to FIG. 4.

Turning now to FIG. 4, the male fitting 130 is illustrated. A recess 136 may be formed into the perimeter of the first tube 110, thereby forming the recess 136 of the male fitting 130. Additionally, or alternatively, the recess 136 may be formed between raised curbs 134, 138 extending from the perimeter of the first tube 110, as illustrated by FIG. 4. In FIG. 4, the raised curbs 134, 138 have an outside diameter D134 greater than the outside diameter Duo of the first tube 110. In this example, the first raised curb 134 and the second raised curb 138 have the same outside diameter D134. However, it is contemplated herein that the outside diameters of the first raised curb 134 and the second raised curb 138 may vary or be different. Similarly, in this example, the recess 136 has the same outside diameter as the outside diameter Duo of the first tube 110. However, in some examples, the outside diameter of the recess 136 may be more or less than the outside diameter Duo of the first tube 110. By example, the thickness of the sidewall of the first tube 110 may be large enough to support a recess 136 formed therein, as opposed to having raised curbs 134, 138 extending from the outside diameter Duo of the first tube 110 as illustrated by FIG. 4.

Still referring to FIG. 4, the recess 136 may extend the entire perimeter, or diameter, of the first tube 110 or a partial perimeter of the first tube 110. Multiple raised curbs 134, 138 may be provided about the perimeter of the first tube 110. In one example, the raised curbs 134, 138 may be formed into the first tube 110. In another example, the raised curbs may be overmolded onto the first tube 110. More specifically, the male fitting 130 may be a polymeric fitting overmolded onto the first tube 110. When the clip 140 of FIG. 1 is engaged within the recess 136 of the first tube 110, the first raised curb 134 prevents the first tube 110, or male fitting 130, from being pulled from the female fitting 120 and the second raised curb 138 prevents the first tube 110, or male fitting 130, from being pushed further into the female fitting 120 when the male fitting 130 is connected to the female fitting 120 by way of the clip 140, as illustrated by FIG. 1.

The male fitting 130 may further comprise a tubular sealing element 132 for insertion into the female fitting 120, for insertion into a second tube 112, and/or for insertion into the female fitting 120 and abutting a second tube 112. In FIG. 4, the tubular sealing element 132 is an extension of the first tube 110 extending from the raised curbs 134, 138 for inserting into the female fitting 120. The tubular sealing element 132 provides additional surface area which may bias the inside of the female fitting 120, may bias the inside of the second tube 112, and/or may abut a second tube 112 for creating a leak-proof connection. In FIG. 4, the tubular sealing element 132 comprises a beveled tip, or a tapered end, for guiding the insertion of the male fitting 130 into the female fitting 120. The tubular sealing element 132 may further comprise additional sealing elements such as, for example, an O-ring, with or without a sealing groove, a gasket, or the like for providing a leak-proof connection between the tubular sealing element 132 and the inside diameter of the female fitting 120. The male fitting 130 may additionally, or alternatively, be described as having a variable-diameter cylindrical body. The variable-diameter cylindrical body may comprise varying diameters across each of the raised curbs 134, 138, the recess 136 (of FIG. 4), the tubular sealing element 132, and/or the outside diameter of the tube 110, or any combination thereof.

Figure 5:
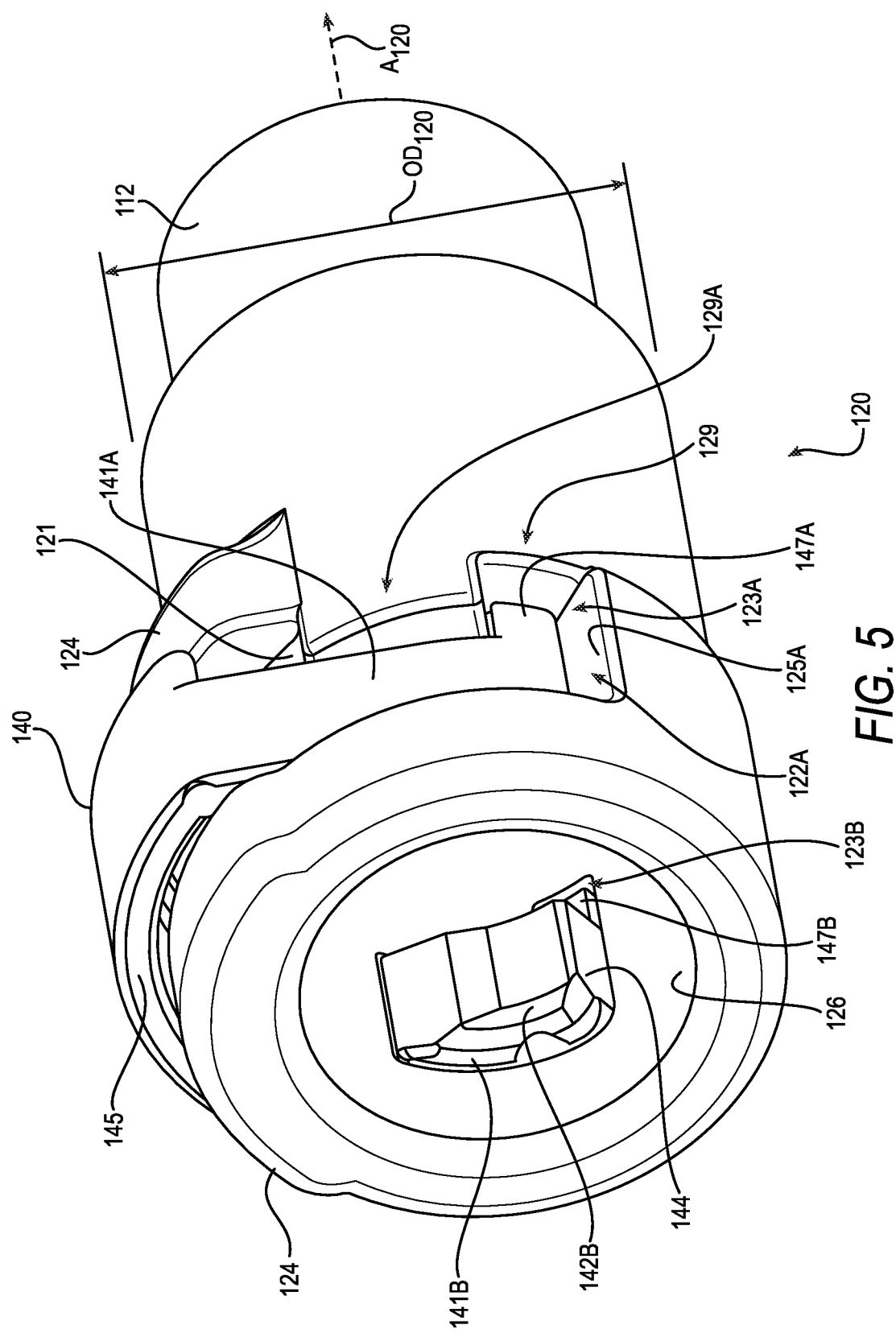
FIG. 5 is a perspective view of a female fitting of a quick-connect fitting, m accordance with an example of the disclosure.
Figure 9:
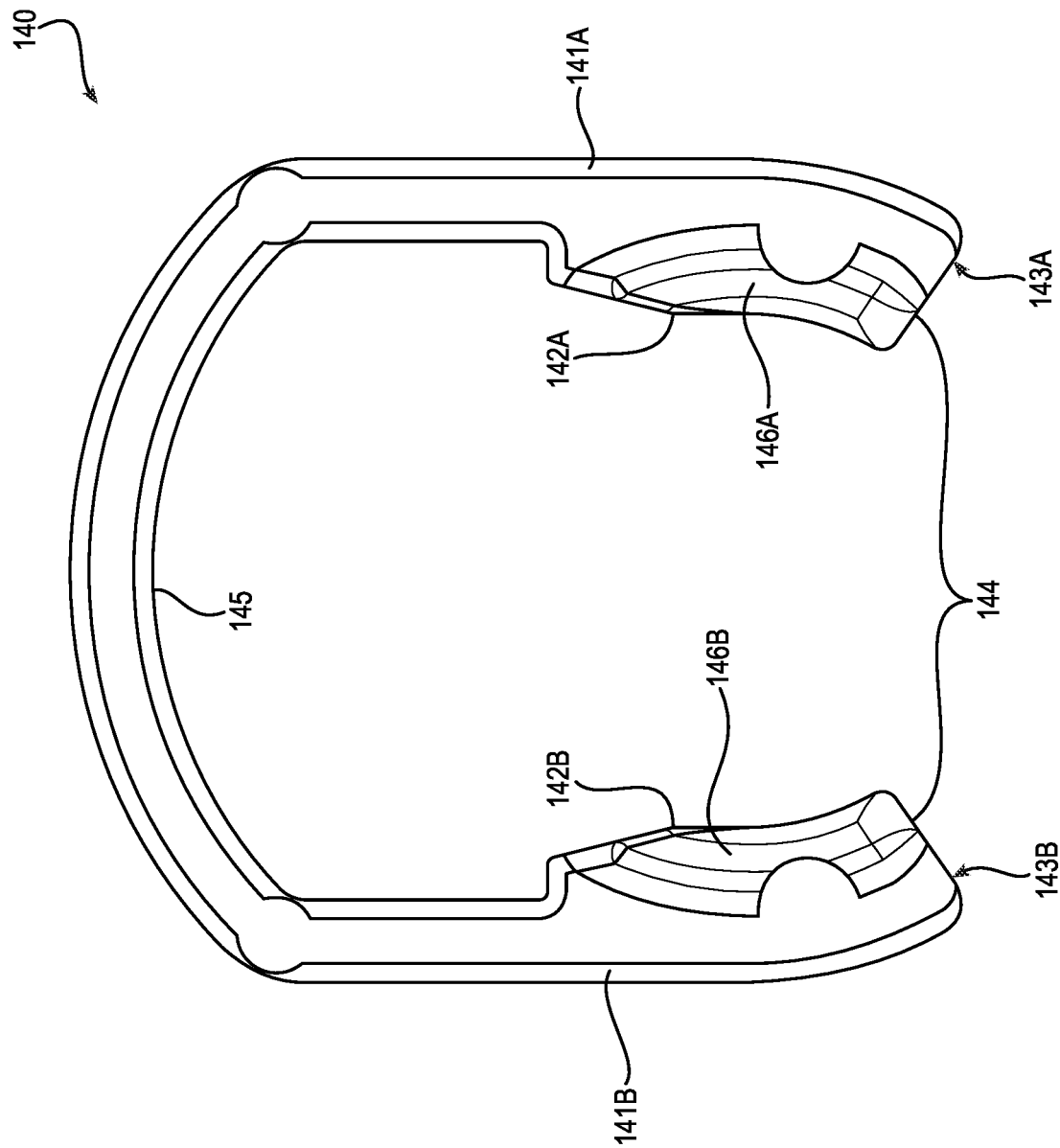
FIG. 9 is front view of a clip, in accordance with an example of the disclosure.
Figure 10:
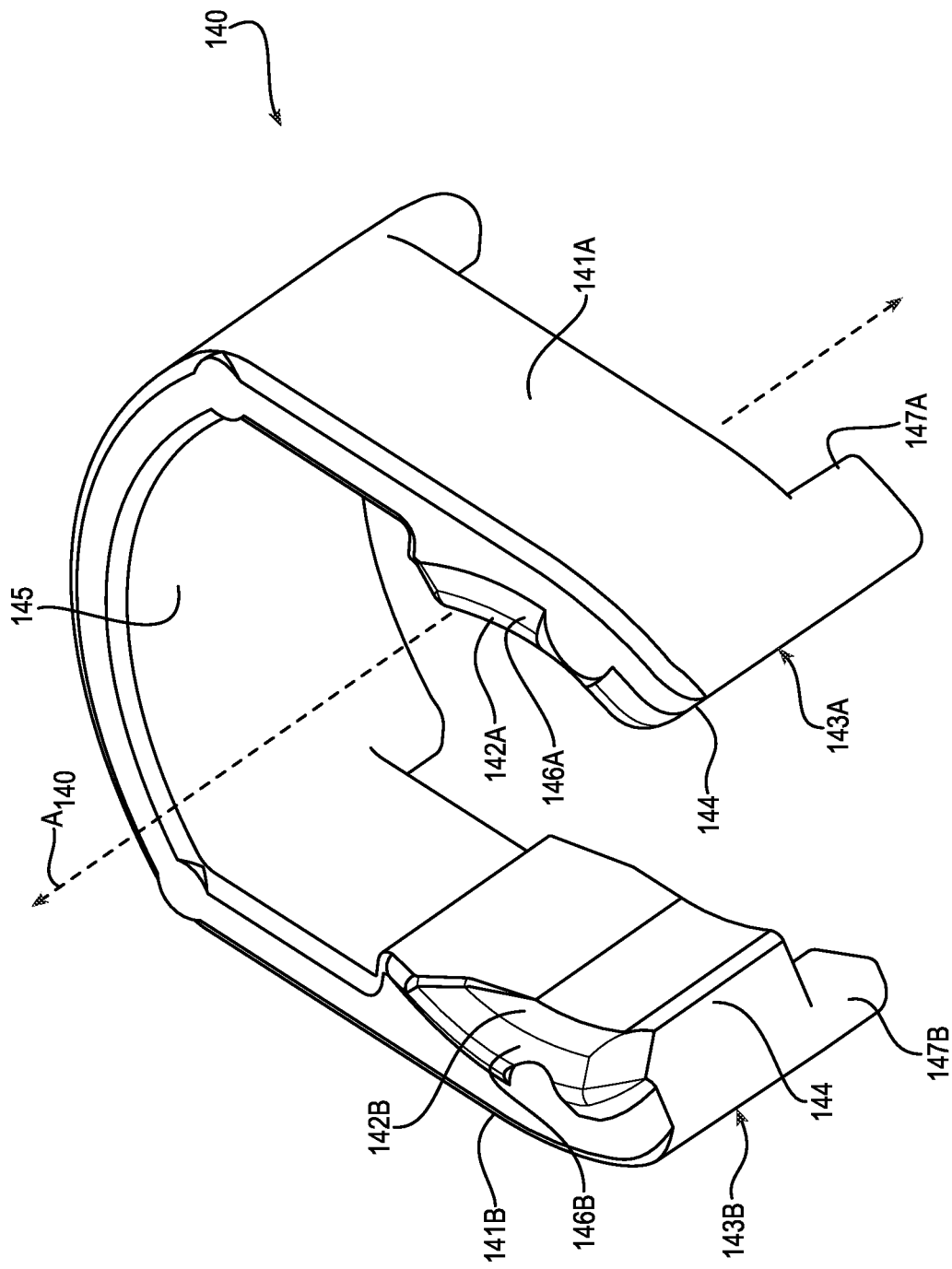
FIG. 10 is a perspective view of a clip, in accordance with an example of the disclosure.

As illustrated by FIG. 4, the male fitting 130 may further comprise a chamfer 135 on the leading edge of the first raised curb 134. The chamfer 135 may be for mating with correspondingly tapered sidewalls 146A, 146B of respective leg protrusions 142A, 142B of the clip 140 (as illustrated by FIGS. 9-10). More specifically and in one example, the clip 140 is arranged about the female fitting 120 without the male fitting 130 inserted therein, as illustrated by FIG. 5. The male fitting 130 may then be inserted into the cylindrical cavity 126 of the female fitting 120. As the male fitting 130 is inserted into the cylindrical cavity 126 of the female fitting 120, the chamfer 135 on the leading edge of the first raised curb 134 engages the leg protrusions 142A, 142B of the clip 140. In one specific example, the chamfer 135 on the leading edge of the first raised curb 134 engages the correspondingly tapered sidewalls 146A, 146B of the respective protrusions leg 142A, 142B (as illustrated by FIG. 9-10). Upon engagement, the chamfer 135 drives the leg protrusions 142A, 142B up and onto the first raised curb 134, thereby, spreading, or respreading, the opposing legs 141A, 141B of the clip 140 apart. While opposing legs 141A, 141B are spread apart, the leg protrusions 142A, 142B are maintained within the respective apertures 122A, 122B of the female fitting 120 and/or the tabs 147 A, 147B are maintained within the respective locking recesses 123A, 123B of the female fitting 120, albeit being raised within each. Upon reaching the recess 136 of the male fitting 130, the leg protrusions 142A, 142B drop from the first raised curb 134 into the recess 136 of the male fitting 130, thereby, locking the male fitting 130 to the female fitting 120 by way of the clip 140. In this example, it is the male fitting 130 which operates or drives the legs 141A, 141B of the clip 140 in order to form the leak-proof connection. Moreover, an audible snap is made when the leg protrusions 142A, 142B drop from the first raised curb 134 into the recess 136 of the male fitting 130, the audible snap being of the type further described below.

Turning now to FIG. 5, the female fitting 120 which receives the male fitting 130 of FIG. 3 is illustrated. In FIG. 5, the clip 140 is illustrated as being secured onto the female fitting 120. The female fitting 120 may be an extension of a second tube 112, as illustrated by FIG. 1. In the example of FIG. 5, the female fitting 120 is a polymeric fitting overmolded onto a second tube 112. Alternatively, the female fitting 120 may be a combination of components formed about the second tube 112. By example, the male fitting 130 of FIG. 3 may be received directly into the second tube 112, or alternatively, the male fitting 130 of FIG. 3 may be received into a cylindrical cavity 126 the female fitting 120 and abut an end of the second tube 112 extending from the female fitting 120. As mentioned above, the female fitting 120 of FIG. 5 may be overmolded onto a second tube 112, or the components of the female fitting 120 may be formed onto the second tube 112 itself. With reference to FIG. 5, the female fitting 120 has a cylindrical cavity 126 extending an axial direction A120. In one example, the polymer of the female fitting 120 may be crosslinked to set a permanent inside diameter of the cylindrical cavity 126 with shape memory characteristics.

Figure 6:
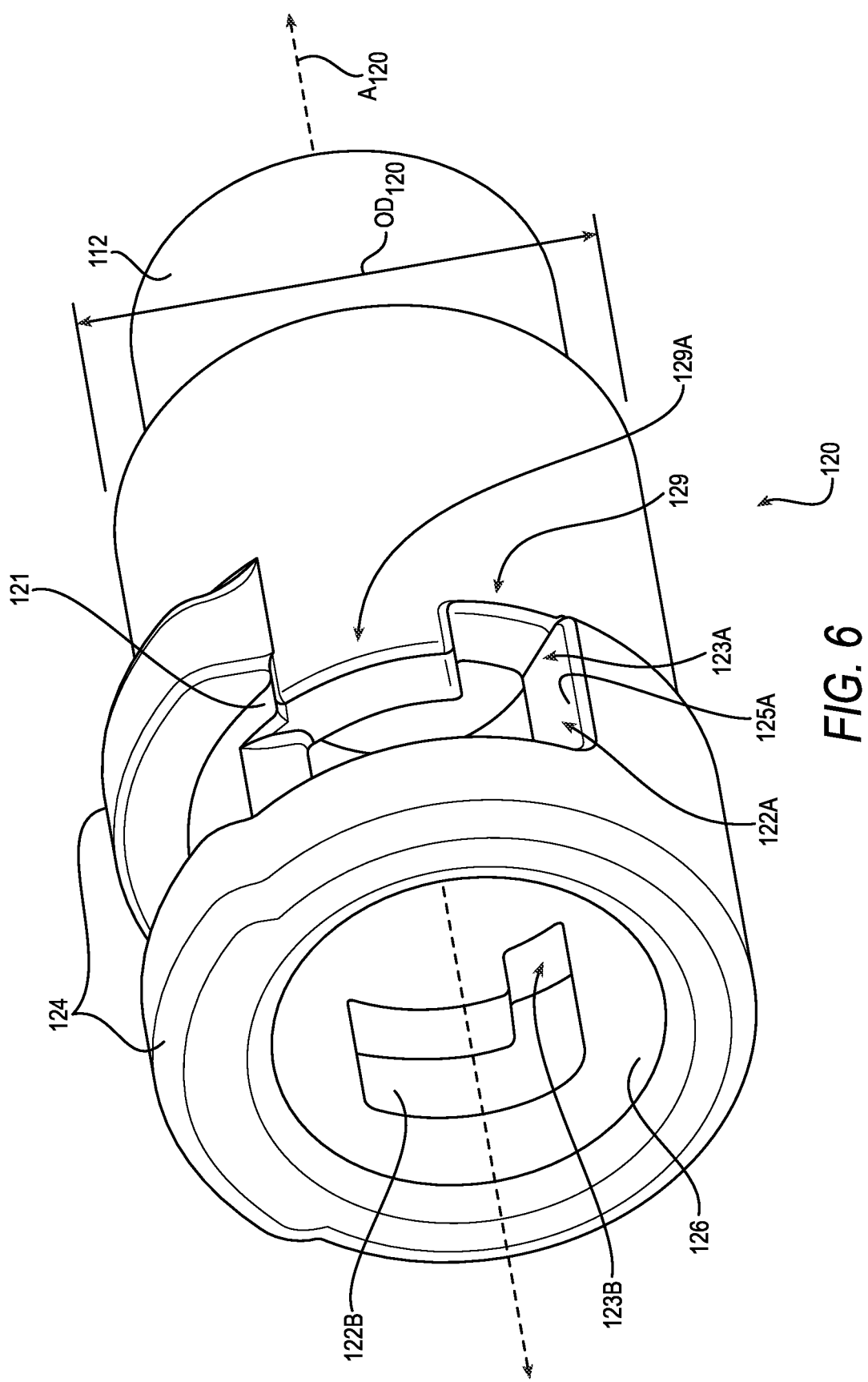
FIG. 6 is a perspective view of the female fitting of the quick-connect fitting of FIG. 5, in accordance with an example of the disclosure.

In FIG. 5, the female fitting 120 comprises a saddle 124 formed by a pair of raised curbs extending from an outside diameter OD120 of the female fitting 120. The pair of raised curbs form a recess therebetween for receiving a seat 145 of the clip 140. The seat 145 of the clip 140 extends from one side of the female fitting 120 to an opposing side of the female fitting 120 such that two opposing legs 141A, 141B extend from the seat 145 into the female fitting 120 from an exterior of the female fitting 120. The female fitting 120 comprises a pair of opposing apertures 122A, 122B, extending through opposing sidewalls of the female fitting 120 extending from the saddle 124 of the female fitting 120. A top wall 121 is maintained at the saddle 124 between the two opposing apertures 122A, 122B. A locking recess 123A, 123B further extends at a base 125A, 125B of each respective aperture 122A, 122B in an axial direction of the female fitting 120. The locking recess 123A, 123B may extend through the respective sidewall 129, forming an extension of each respective aperture 122A, 122B, or may simply be a locking recess 123A, 123B formed in the respective sidewall 129 within the exterior of the respective sidewall 129. Each respective locking recess 123A, 123B is separated from saddle 124 of the female fitting 120 by a section of sidewall 129A extending adjacent a length of each respective aperture 122A, 122B. FIG. 6 illustrates these same features of the female fitting 120 without the clip 140 of FIG. 5.

Returning to FIG. 5, the two opposing legs 141A, 141B of the clip 140 comprise a respective tabs 147 A, 147B which extend from the respective legs 141A, 141B of the clip 140 in an axial direction of the female fitting 120, when the clip 140 is positioned within the female fitting 120. When the clip 140 is secured to the female fitting 120 the tabs 147 A, 147B are seated within a respective locking recess 123A, 123B extending from the respective apertures 122A, 122B. In order to secure the clip 140 to the female fitting 120, the legs 141A, 141B of the clip 140 must be spread apart such that the tabs extend about the outside diameter, or perimeter, of the sidewalls of the female fitting 120. The clip 140 is forced onto the female fitting 120, driving the opposing legs 141A, 141B about the exterior of the sidewalls 129 of the female fitting 120, and more specifically, the section of sidewall 129A extending adjacent a length of each respective aperture 122A, 122B. Once each tab is overtop a respective locking recess 123A, 123B, extending from the respective apertures 122A, 122B, the legs 141A, 141B snap toward one another and toward the axis A120 of the female fitting 120 and into the respective apertures 122A, 122B, where each respective tab additionally snap into the respective locking recesses 123A, 123B. This snapping action may be accomplished by the polymeric clip 140 by way of shape memory where the respective legs 141A, 141B of the clip 140 are forced back into their original position, or the position of the clip 140 before the clips 140 were spread apart to be forced about the female fitting 120. In one example, the first leg 141A is parallel to the second leg 141B in this original position. The parallel arrangement may be maintained by way of shape memory of a polymer. The snapping action occurs when the clip 140 snaps into the first aperture 122A and/or the second aperture 122B from a raised position and is also configured to make an audible snap, or audible click, by dropping from the raised, or elevated, position abruptly into a resting, or seated, position. Additionally, or alternatively, the first tab 147 A and/or the second tab 147B additionally snap into the respective locking recesses 123A, 123B from a raised position, as maintained by the exterior of the female fitting 120, and are also configured to make an audible snap, or audible click, upon dropping from the raised position abruptly into a resting, or seated, position. In other words, the audible snap, or audible click, is produced by dropping the leg protrusions 142A, 142B into the male fitting 130 recess 136 (as illustrated by FIG. 4) and/or dropping the respective tabs 147 A, 147B into the respective locking recess 123A, 123B of the female fitting 120 from the exterior, or outside surface, of female fitting 120 as opposed to simply sliding the respective legs 141A, 141B about the male fitting 130 without dropping the legs 141A, 141B into position. The respective legs 141A, 141B of the clip 140 rest within the respective apertures 122A, 122B of the female fitting 120 along with the tabs 147 A, 147B resting within the respective locking recesses 123A, 123B of the female fitting 120. In one example, the male fitting 130 (inserted into the female fitting 120) remains concealed by the combination of the female fitting 120 and the clip 140. Moreover, by way of having the legs 141A, 141B spread about the female fitting 120, and snapped into position within the respective apertures 122A, 122B and/or locking recesses 123A, 123B of the female fitting 120, the audible click, or sound, is made by the contact generated as noted above between the components giving an installer confirmation of completing the connection between the female fitting 120, the male fitting 130, and the clip 140. This audible confirmation eliminates installer error and ensures the leak proof connection is made between the male fitting 130 and the female fitting 120. Further, a tactile confirmation, that a connection has been completed, may also be noted by having the respective legs 141A, 141B and/or the respective tabs 147 A, 147B recessed below the outside surface of the female fitting 120 after having been properly dropped into the respective apertures 122A, 122B, recess 136 (of FIG. 4), and/or locking recesses 123A, 123B. Additionally, or alternatively, a visual indicator may also be relied on to give an installer confirmation of completing the connection between the female fitting 120, the male fitting 130, and the clip 140. For example, a completed connection may be confirmed by fully concealing the male fitting 130, or upon concealing the second raised curb 138 of the male fitting 130 (as illustrated by FIG. 4), within the female fitting 120. In other words, in one example, the second raised curb 138 disappears into the female fitting 120 when the connection is properly made.

Turning now to FIGS. 9-10, the features of the clip 140 are illustrated. In the example shown in FIGS. 9-10, the clip 140 is an inverted U-shape and is symmetrical about a plane dividing the first leg from the second leg. The clip 140 comprises a seat 145 and two opposing legs 141A, 141B extending from the seat 145. In FIGS. 9-10 the seat has a curvature so to mate with the saddle 124 of the female fitting 120, as illustrated by FIG. 7. The pair of opposing legs 141A, 141B extend from opposing ends of the seat 145 in the same direction from the seat 145. At the base 143A, 143B of each leg 141A, 141B, opposite the seat 145, are leg protrusions 142A, 142B extending inwardly from each leg 141A, 141B. The leg protrusions 142A, 142B are inserted in through the respective apertures 122A, 122B, and into the locking recess 123A, 123B of the male fitting 130. By securing the legs 141A, 141B within the apertures 122A, 122B of the female fitting 120, and extending the seat 145 of the clip 140 about the saddle 124 of the female fitting 120, the protrusions leg 142A, 142B extending from the clip 140 and lock the male fitting 130 to the female fitting 120, where the clip 140 extends through both the male fitting 130 and the female fitting 120 from the exterior of both. Moreover, the clip 140 remains accessible and visible from the exterior of both the male fitting 130 and the female fitting 120, while the female fitting 120 and the clip 140 fully conceal the male fitting 130 inserted into the female fitting 120. With specific reference to FIG. 10, the clip 140 further comprise tabs 147 A, 147B extending in a direction of the axis A140 of the clip 140, which is the axial direction of the male fitting 130 and female fitting 120 when the waterway connection is assembled. The tabs 147 A, 147B may extend only a partial depth of the leg protrusions 142A, 142B of each respective leg 141A, 141B, as illustrated by FIG. 10. Additionally, or alternatively, the tabs 147A, 147B may also be an extension of the leg protrusions 142A, 142B of each respective leg 141A, 141B. Alternatively, the leg protrusions 142A, 142B may be limited to the tabs 147 A, 147B of the clip 140, the tabs 147 A, 147B extend through respective apertures 122A, 122B of the female fitting 120 such that the tabs 147 A, 147B extend into the recess 136, or respective recesses, of the male fitting 130 (as illustrated by FIG. 4). The clip 140 may be made from a rigid or semi-rigid polymeric material such as polyacetal, nylon or polyamide, acrylonitrile butadiene styrene terpolymer, polystyrene, polycarbonate, polyvinyl chloride, polyethylene terephthalate polyester, or other polymeric material as desired for the application suitable for retaining the male fitting 130 in the cylindrical cavity 126 under the loading and environmental conditions of the desired application. In one example, the clip 140 is glass-filled nylon.

Figure 8:
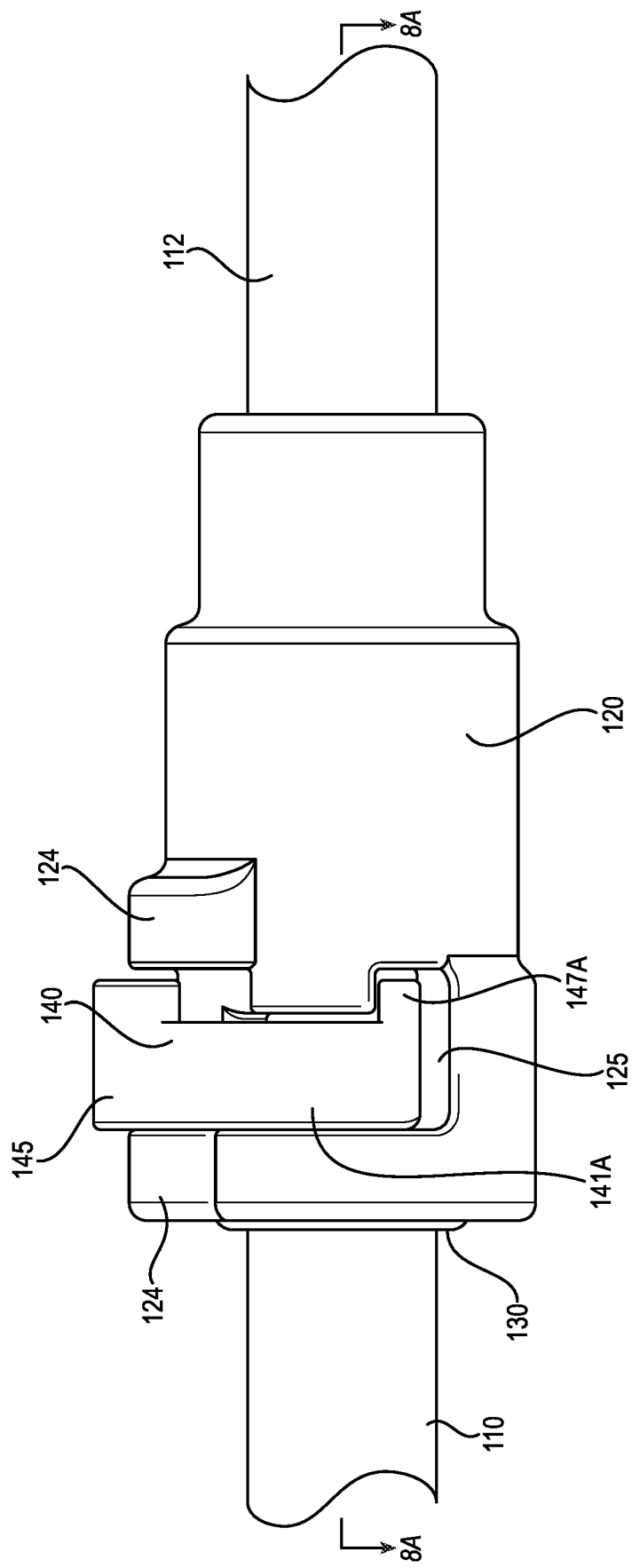
FIG. 8 is a side view of the male and female fittings of the quick-connect fitting, in accordance with an example of the disclosure.

The waterway connection may further comprise features for releasing the male fitting 130 from the female fitting 120 after the male fitting 130 and the female fitting 120 are secured together by the clip 140. Still referring to FIGS. 9-10, the base 143A, 143B of each respective leg 141A, 141B of the clip 140 may further comprise beveled, or tapered, edges 144. As illustrated by FIG. 10, the beveled, or tapered, edges 144 extend the entire base 143A, 143B of the legs 141A, 141B, including the base of the tabs 147 A, 147B. The beveled, or tapered, edges 144 are tapered where the leg protrusions 142A, 142B narrow inwardly in a direction of the axis A140 of the clip 140. Turning now to FIGS. 5 and 8, illustrating the female fitting 120 with a clip 140 and FIGS. 6-7 illustrating the female fitting 120 without a clip 140, the beveled, or tapered edges 144 of the clip 140 are meant to bias a respective base 125A, 125B of the apertures 122A, 122B extending through the opposing sidewalls of the female fitting 120. The aperture bases 125A, 125B are additionally beveled, or tapered, such that the bevel, or taper, of the apertures 122A, 122B widen the aperture outwardly at their respective bases 125A, 125B or, in other words, narrow the apertures 122A, 122B inwardly in a direction of the axis of the female fitting 120. The beveled, or tapered, edges 144 of the clip 140 mate and rest on the beveled, or tapered, edges of the aperture bases 125A, 125B as the legs 141A, 141B of the clip 140 rest within and fill the respective apertures 122A, 122B and the tabs 147 A, 147B rest within and fill the respective locking recesses 123A, 123B. When the legs 141A, 141B of the clip 140 rest and fill the respective apertures 122A, 122B the seat 145 of the clip 140 is positioned within the saddle 124 of the female fitting 120 but a bottom of the seat 145 remains separated from the outside diameter of the female fitting 120. Upon applying a force to the exterior surface of the seat 145 of the clip 140, the clip 140 may be forced into and may become fully seated within the saddle 124 of the female fitting 120, closing the separation between the bottom of the seat 145 and the outside diameter of the female fitting 120. The seat 145 may be forced fully into the saddle 124 by way of this external force. An example of such a force is imparting pressure onto the clip 140 by simply pushing the clip 140 into the saddle 124 of the female fitting 120. This may be done manually, by a tool, or a combination thereof. When the seat 145 is forced into the saddle 124 of the female fitting 120, the legs 141A, 141B of the clip 140 are forced apart, where the leg protrusions 142A, 142B extending through the apertures 122A, 122B of the female fitting 120 and into the recess 136 of the male fitting 130 (as illustrated by FIG. 4) are released from the recess 136 of the male fitting 130 (as illustrated by FIG. 4). This is accomplished by way of the bevel, or tapered, bases 143A, 143B of the clip 140 biasing the opposing beveled, or tapered, bases 125A, 125B of the apertures 122A, 122B. The respective beveled, or tapered, bases 143A, 143B of the clip 140 slide along the opposing and respective beveled, or tapered, bases 125A, 125B of the apertures 122A, 122B driving the legs 141A, 141B apart under the force applied to the seat 145 that forces the seat 145 into the saddle 124 of the female fitting 120. While the leg protrusions 142A, 142B may be forced from the recess 136 of the male fitting 130 (as illustrated by FIG. 4), the legs 141A, 141B of the clip 140 remain secured within the aperture by way of the tabs 147 A, 147B extending from each respective leg 141A, 141B and by remaining within the locking recess 123A, 123B that have received the respective tabs 147 A, 147B. More specifically, because the body of the female fitting 120 remains between the locking recess 123A, 123B and the saddle 124 of the female fitting 120 and, thereby, between the tabs 147A, 147B and the seat 145 of the clip 140, the clip 140 remains secured within the female fitting 120 while the waterway connection is disconnected, thereby, keeping the female fitting 120 and the clip 140 secured together as a single unit for reuse. Upon removing the male fitting 130 from the female fitting 120, and releasing the force on the seat 145 of the clip 140, the legs 141A, 141B are drawn back together within the apertures 122A, 122B of the female fitting 120 such that they are, again, seated within the apertures 122A, 122B of the female fitting 120 and the tabs 147 A, 147B are, again, seated, into the locking recess 123A, 123B of the female fitting 120. The same process is undertaken to reinsert the male fitting 130 into the female fitting 120 where the leg protrusions 142A, 142B extending from the legs 141A, 141B are again seated into the recess 136 of the male fitting 130 (as illustrated by FIG. 4) upon releasing the pressure forcing the seat 145 of the clip 140 into the saddle 124 of the female fitting 120.

Figure 8A:
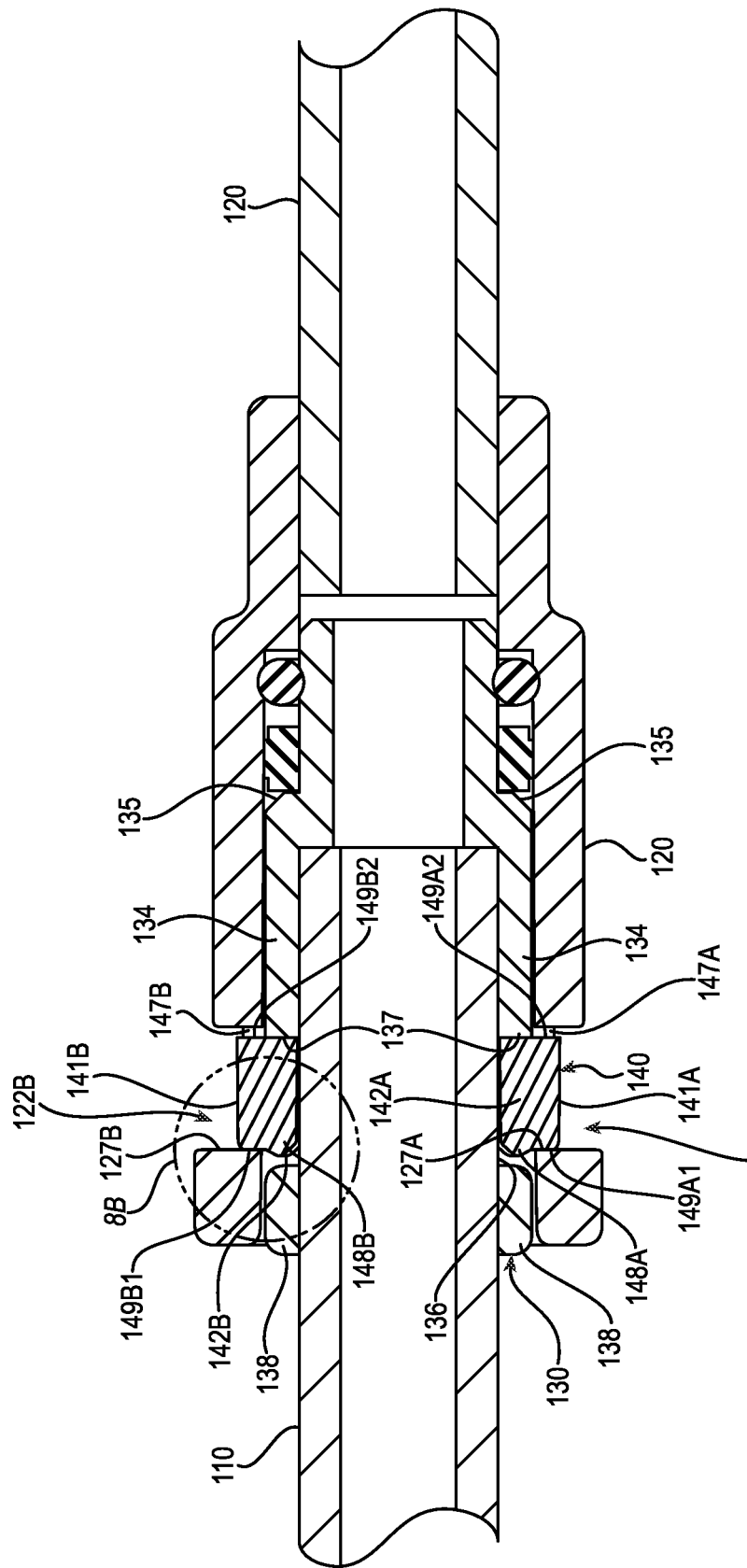
FIG. 8A is a cross-section taken at line 8A-8A of FIG. 8, in accordance with an example of the disclosure.
Figure 8B:
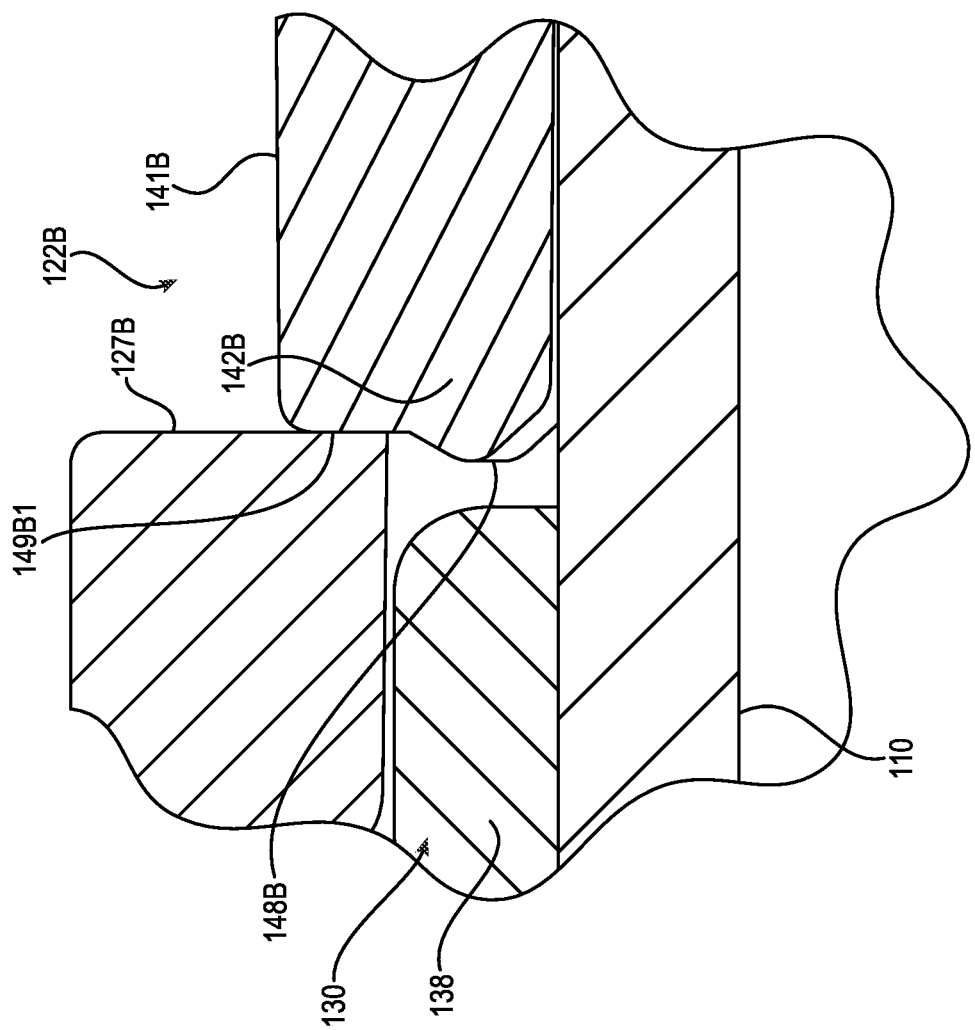
FIG. 8B is an enlarged view of part of FIG. 8A.

Turning now to FIGS. 8A and 8B, FIG. 8A illustrates a cross-section of the leak-proof connection of FIG. 8, taken at line 8A-8A. FIG. 8B is an enlarged view of part of FIG. SA. Illustrated is the male fitting 130 having a first raised curb 134 and a second raised curb 138 with a recess 136 therebetween. The first raised curb 134 comprises the chamfer 135 on the leading edge as described above. In some examples, the chamfer may additionally, or alternatively, be a radius. The leg protrusions 142A, 142B of the clip 140 are positioned within the recess 136 between the first raised curb 134 and the second raised curb 138. The tabs 147 A, 147B are also illustrated as being seated within respective locking recesses (not illustrated in FIGS. 8A and 8B). When a fluid is forced through the leak-proof connection, the fluid pressure will cause the male fitting 130 to try and separate from the female fitting 120 in an axial direction. In other words, the fluid pressure forces the male fitting 130 apart from the female fitting 120 in an axial direction. When this occurs, a face 127 A, 127B of each respective aperture 122A, 122B of the female fitting 120 abuts a respective sidewall 149A1, 149B1 of the clip 140. Similarly, the opposite sidewalls 149A2, 149B2 of the clip 140 engage a face 137 of a raised curb and, specifically, the first raised curb 134, as illustrated by FIG. 5A. In other words, the legs 141A, 141B of the clip 140 have a width which spans both the recess 136 of the male fitting 130 and the respective apertures 122A, 122B of the female fitting 120. By being positioned between the respective faces 127 A, 127B of the female fitting 120 and the face 137 of the male fitting 130, the male fitting 130 and female fitting 120 are kept from becoming separated under the pressure of the fluid passing through the leak-proof connection.

Further, the respective leg protrusions 142A, 142B of the first leg 141A and the second leg 141B of the clip 140 of FIGS. 8A and 8B are further illustrated to comprise respective retaining edges 148A, 148B, or extension. The retaining edges 148A, 148B extend from the sidewall 149A1, 149B1 of the clip 140 and are forced from the respective apertures 122A, 122B, which they were inserted in through, to up under the female fitting 120, such that the retaining edges 148A, 148B are between the male fitting 130 and the female fitting 120. This arrangement further secures the clip 140 to the male fitting 130 and female fitting 120 and prevents the clip 140 from being inadvertently released from the male fitting 130 and the female fitting 120 when fluid is advancing through the leak-proof connection by utilizing pressure from the fluid pressure passing through the leak-proof connection.

Figure 11:
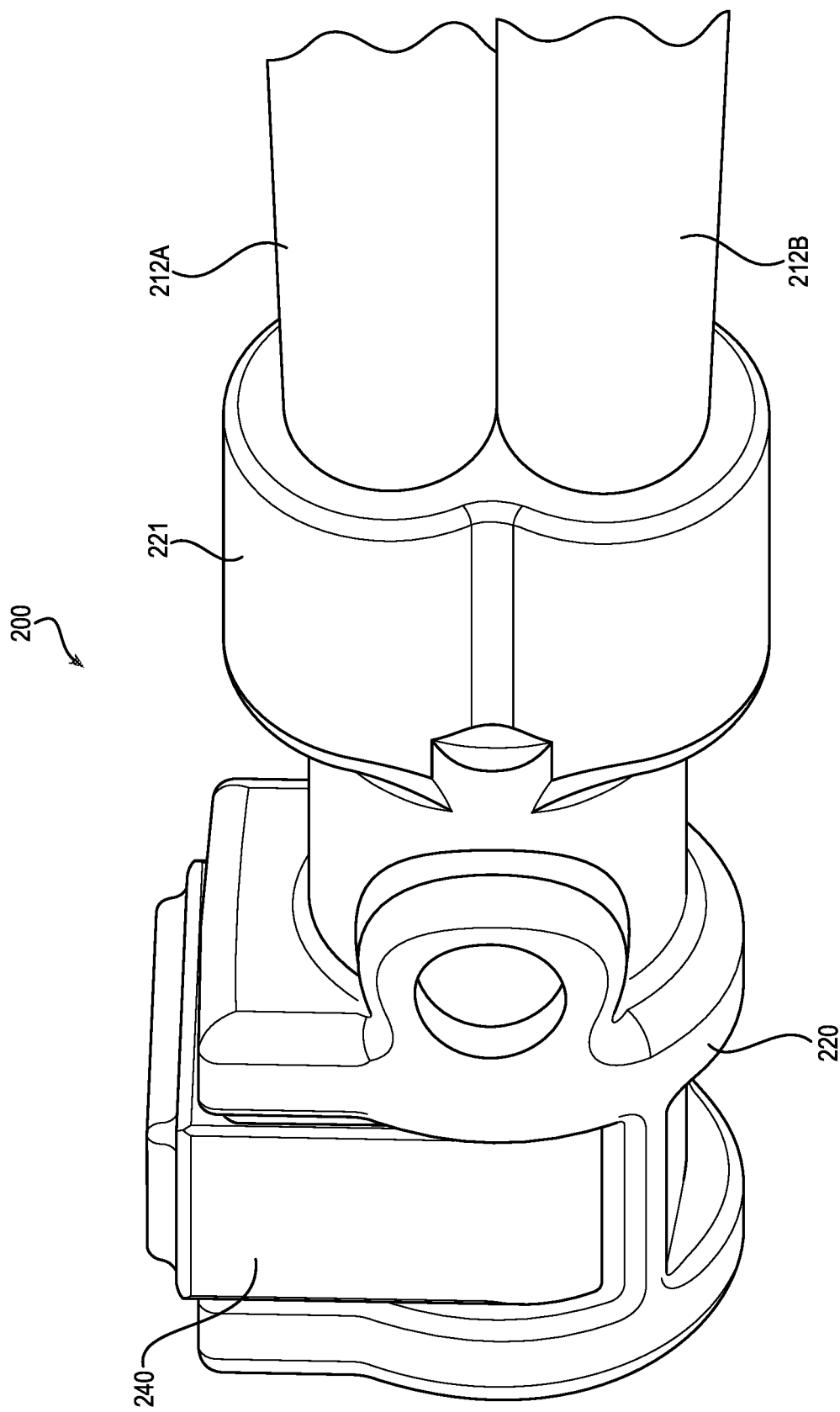
FIG. 11 is a perspective view of the female fitting of the quick-connect fitting, in accordance with an example of the disclosure.
Figure 12:
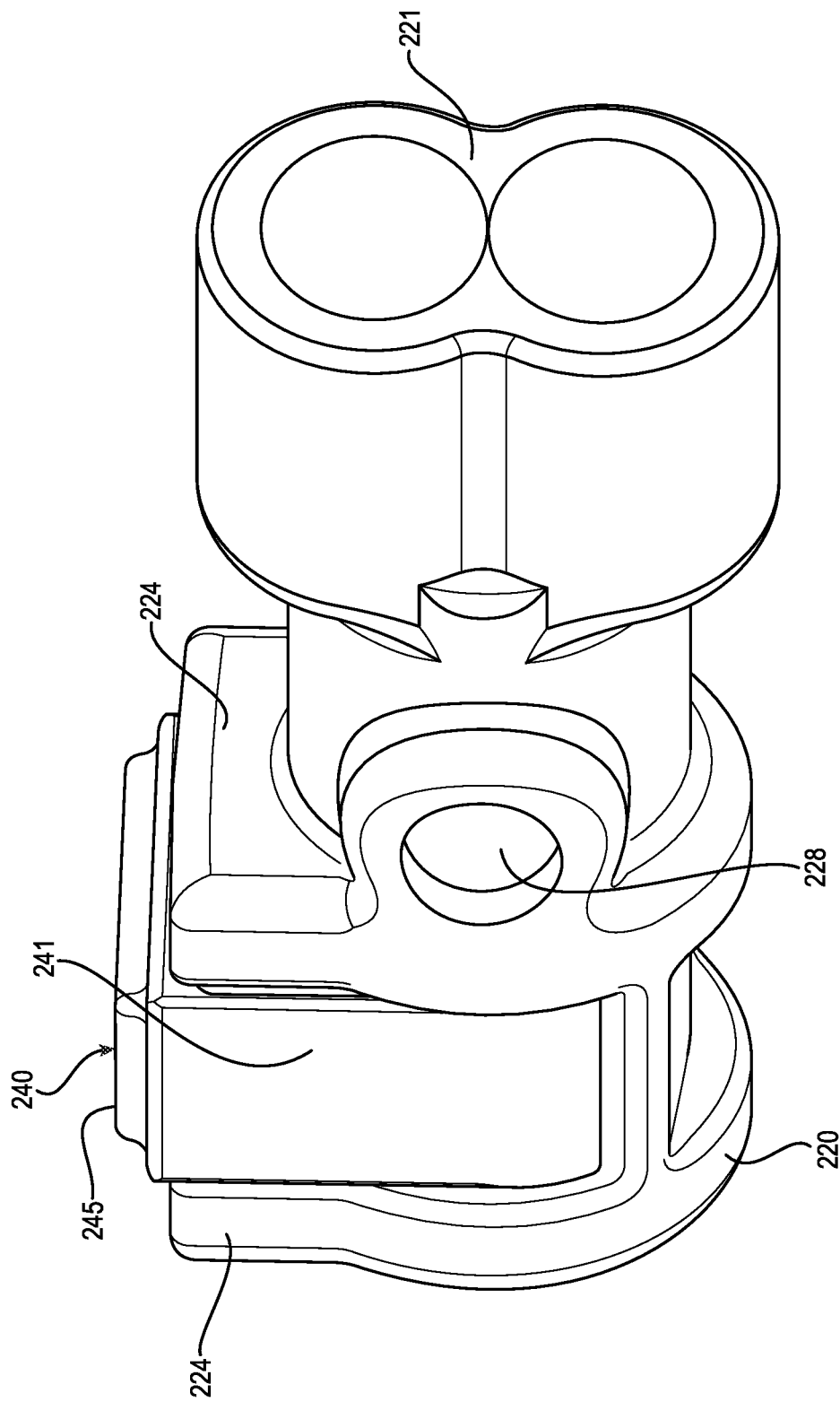
FIG. 12 is a perspective view showing the female fitting of FIG. 11, in accordance with an example of the disclosure.
Figure 13:
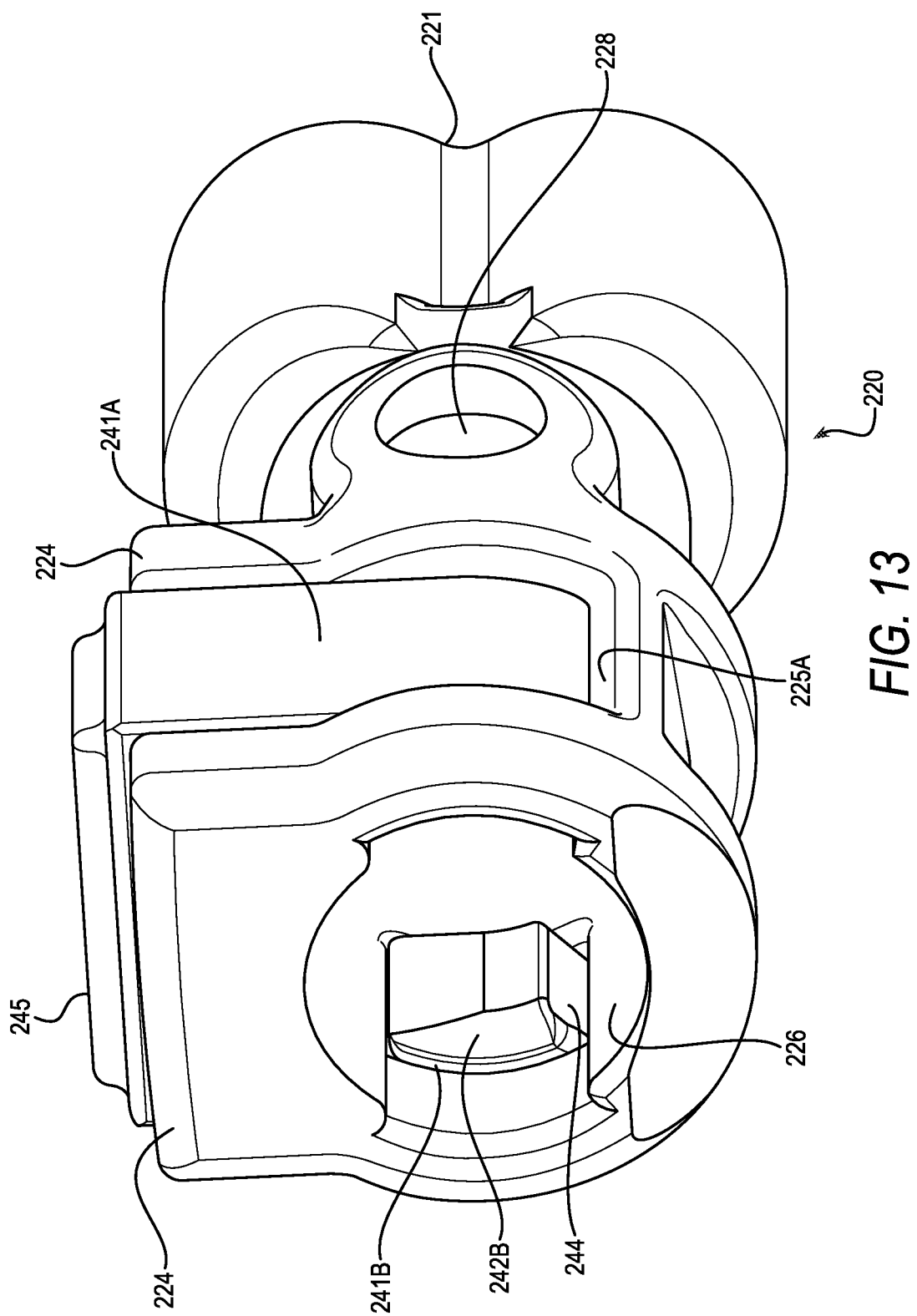
FIG. 13 is a perspective view of a female fitting of a quick-connect fitting, in accordance with an example of the disclosure.

FIGS. 11-22 illustrate another example of the present disclosure. FIGS. 11-13 illustrate a female fitting 220, for receiving the male fitting 130 as further illustrated by FIGS. 4 and 15. In FIGS. 11-13, the clip 240 is illustrated as being secured onto the female fitting 220. The female fitting 220 may be an extension of a second tube 112 (as illustrated by the examples of FIG. 1). However, as illustrated by FIG. 11, the female fitting 220 shown overmolded onto a Y-connector 221 instead of a second tube 112. The Y-connector 221 allows the female fitting 220 to connect multiple tubes 212A, 212B, as illustrated by FIG. 11. The clip 240 functions in the same manner as the clip 140 as described above.

Figure 18:
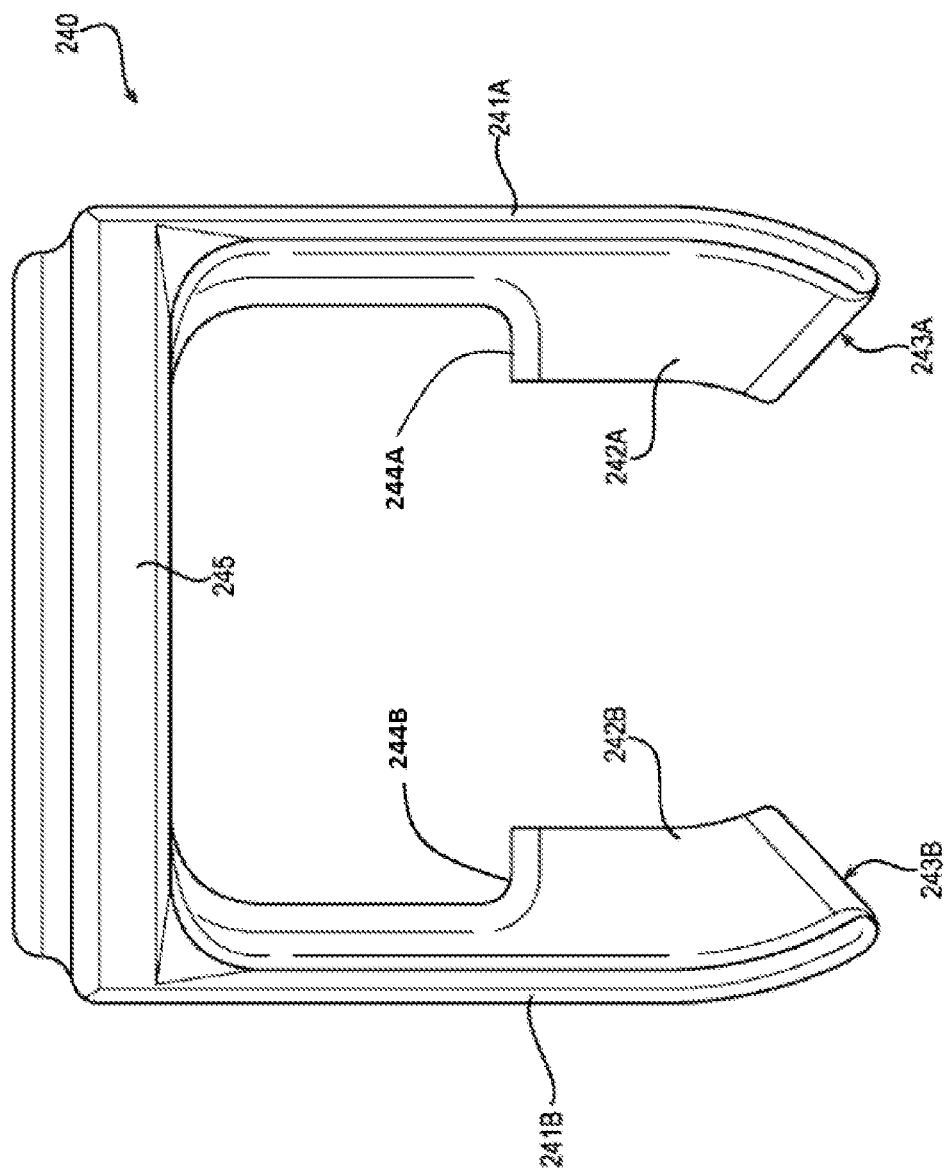
FIG. 18 is a front view of a clip, in accordance with an example of the disclosure.
Figure 19:
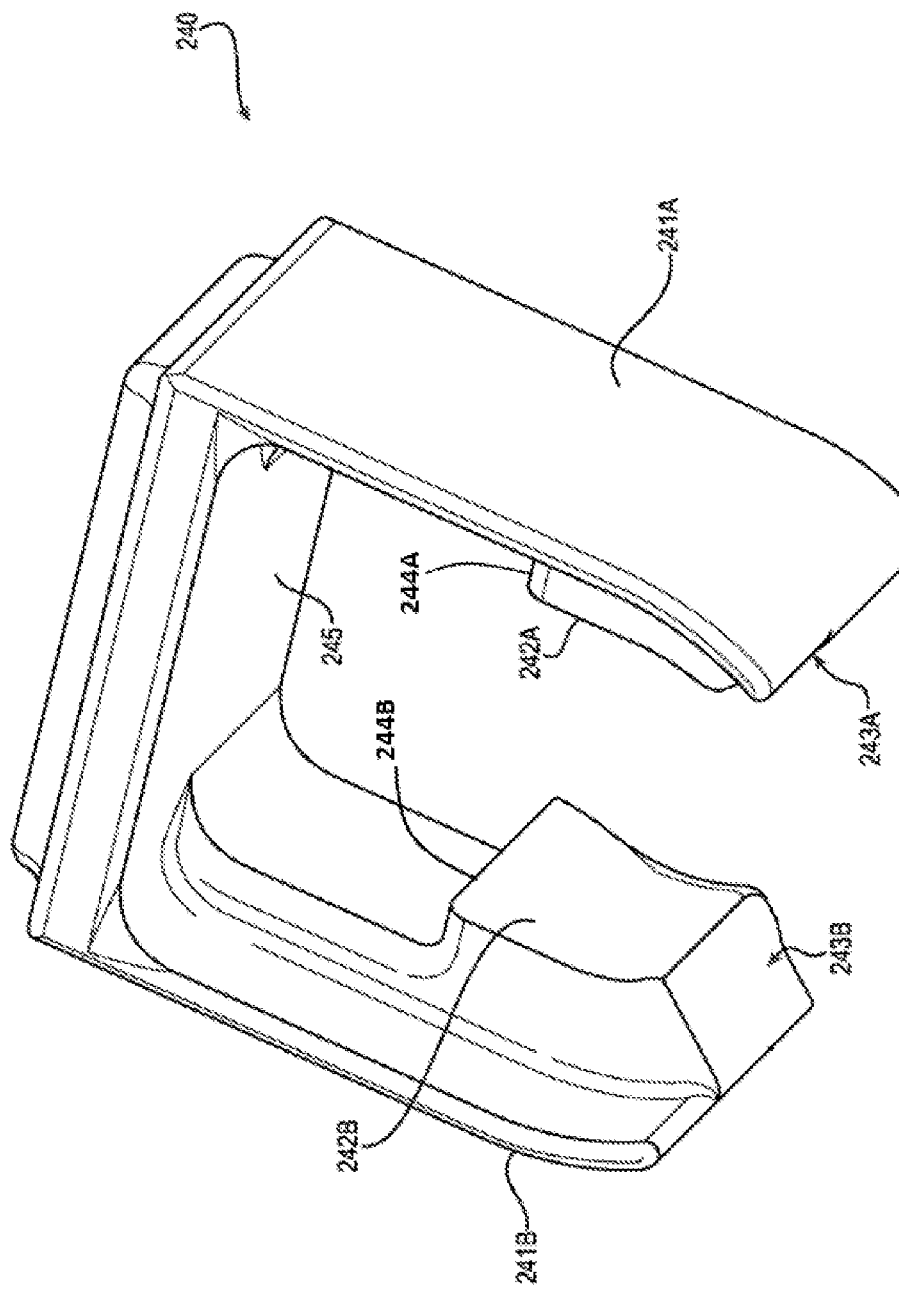
FIG. 19 is a perspective view of a clip, in accordance with an example of the disclosure.

Specifically, the features of the clip 240 are illustrated in FIGS. 18-19. In the example shown in FIGS. 18-19, the clip 240 is an inverted U-shape. The clip 240 comprises a seat 245 and two opposing legs 241A, 241B extending from the seat 245. The pair of opposing legs 241A, 241B extend from opposing ends of the seat 245 in the same direction from the seat 245. At the base 243A, 243B of each leg 241A, 241B, opposite the seat 245, are protrusions 242A, 242B extending inwardly from each leg 241A, 241B. The protrusions 242A, 242B are inserted in through the respective apertures 222A, 222B, and into the recess 236 of the male fitting 230, as illustrated by FIGS. 4 and 13-15. By securing the legs 241A, 241B within the apertures 222A, 222B of the female fitting 220, and extending the seat 245 of the clip 240 about the saddle 224 of the female fitting 220, the protrusions 242A, 242B extending from the clip 240 lock the male fitting 130 to the female fitting 220 where the clip 240 extends through both the male fitting 130 and the female fitting 220 from the exterior of both. Moreover, the clip 240 remains accessible and visible from the exterior of both the male fitting 130 and the female fitting 220 while the clip 240 and the female fitting 220 fully conceal the male fitting 130 within the female fitting 220. With specific reference to FIG. 19, the clip 240 further comprise a ledge 244A, 244B offset from the protrusions 242A, 242B of the clip 240. The ledges 244A, 244B operate in similar fashion as the tabs 147A, 147B of the clip 140 of the FIGS. 9-10 for maintaining the clip 240 about the exterior of the female fitting 220 while, or until, the protrusions 242A, 242B extend through the respective apertures 222A, 222B of the female fitting 220 and into the recess 136 of the male fitting 130 (as illustrated by FIGS. 4 and 13-15). The legs 241A, 241B of the clip 240 of FIGS. 18-19 may be operated, or driven, by the male fitting 130 male fitting (of FIG. 4) just as the legs 141A, 141B of the clip 140 of FIGS. 9-10 are described as being operated and driven in order to form the leak-proof connection. Also, an audible snap is made when the protrusions 242A, 242B drop from the first raised curb 134 into the recess 136 of the male fitting 130 as also described above with respect to the leg protrusions 142A, 142B of the clip 140, above. The audible snap being of the type further described above. It is also acknowledged herein that the arrangement, or any component thereof, as described with respect to FIG. 8A may also apply to the clip of FIGS. 18-19.

Again, the clip 240 may be made from a rigid or semi-rigid polymeric material such as polyacetal, nylon or polyamide, acrylonitrile butadiene styrene terpolymer, polystyrene, polycarbonate, polyvinyl chloride, polyethylene terephthalate polyester, or other polymeric material as desired for the application suitable for retaining the male fitting 130 in the cylindrical cavity 226 under the loading and environmental conditions of the desired application. In one example, the clip 240 is glass-filled nylon.

Figure 14:
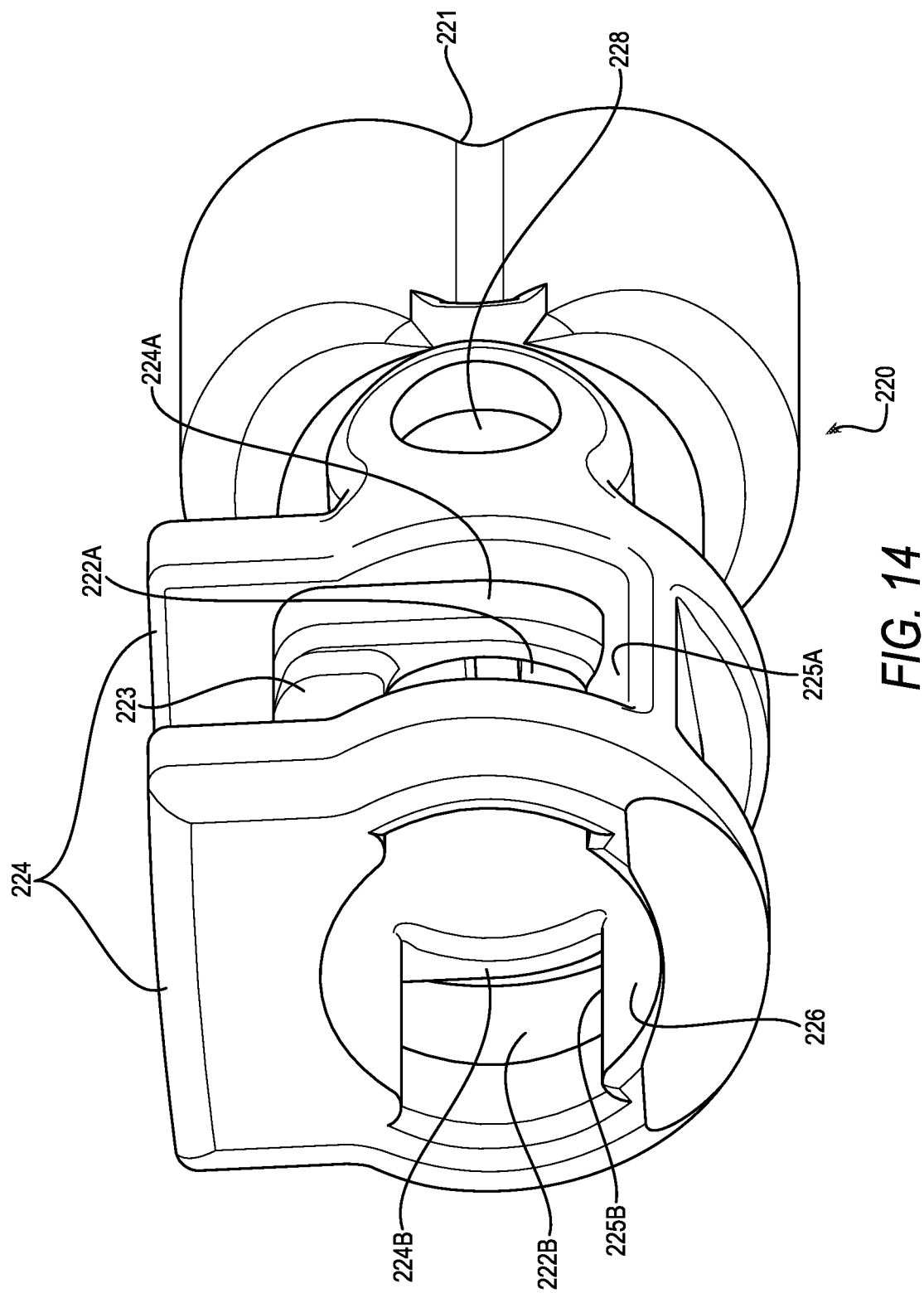
FIG. 14 is a perspective view of the female fitting of the quick-connect fitting of FIG. 13, in accordance with an example of the disclosure.
Figure 15:
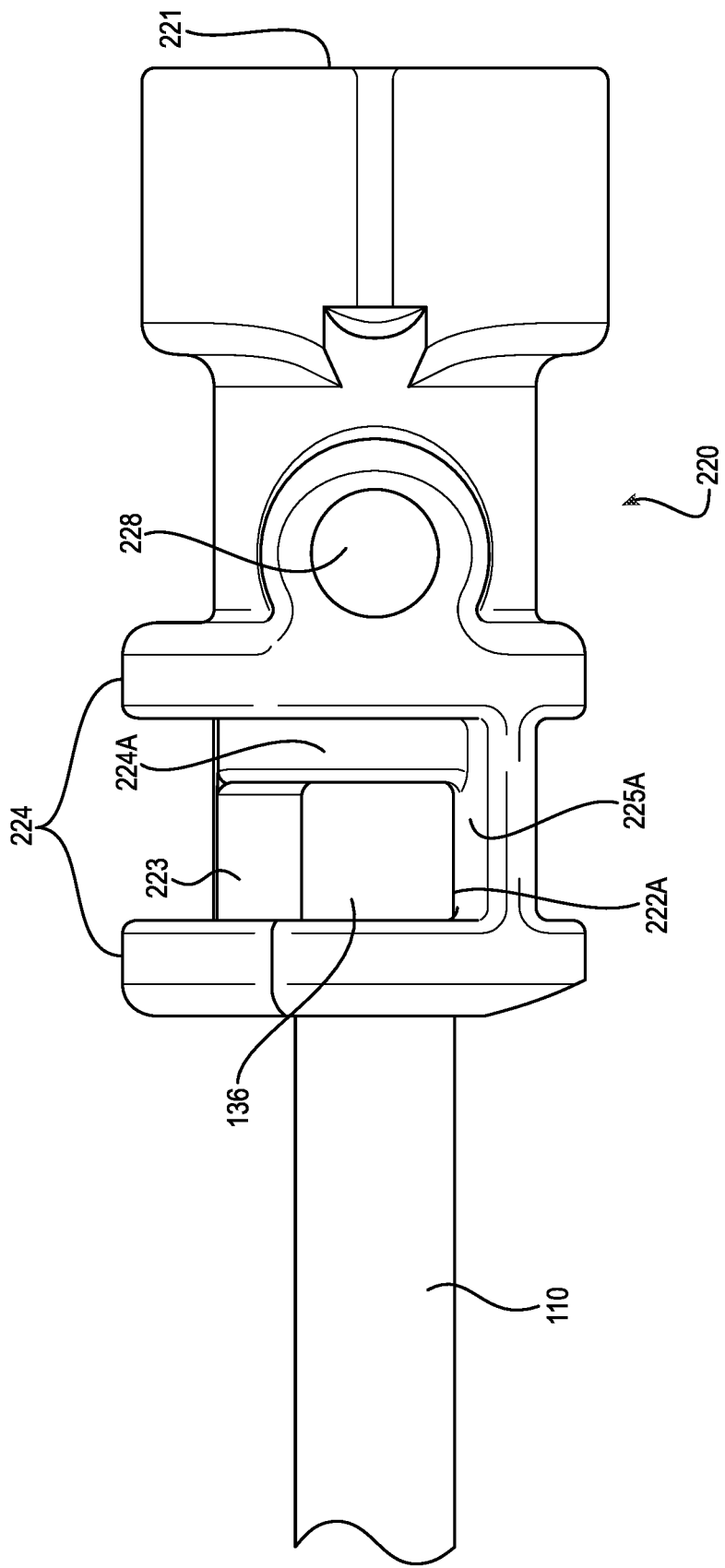
FIG. 15 is a side view of the male and female fittings of the quick-connect fitting, in accordance with an example of the disclosure.
Figure 16:
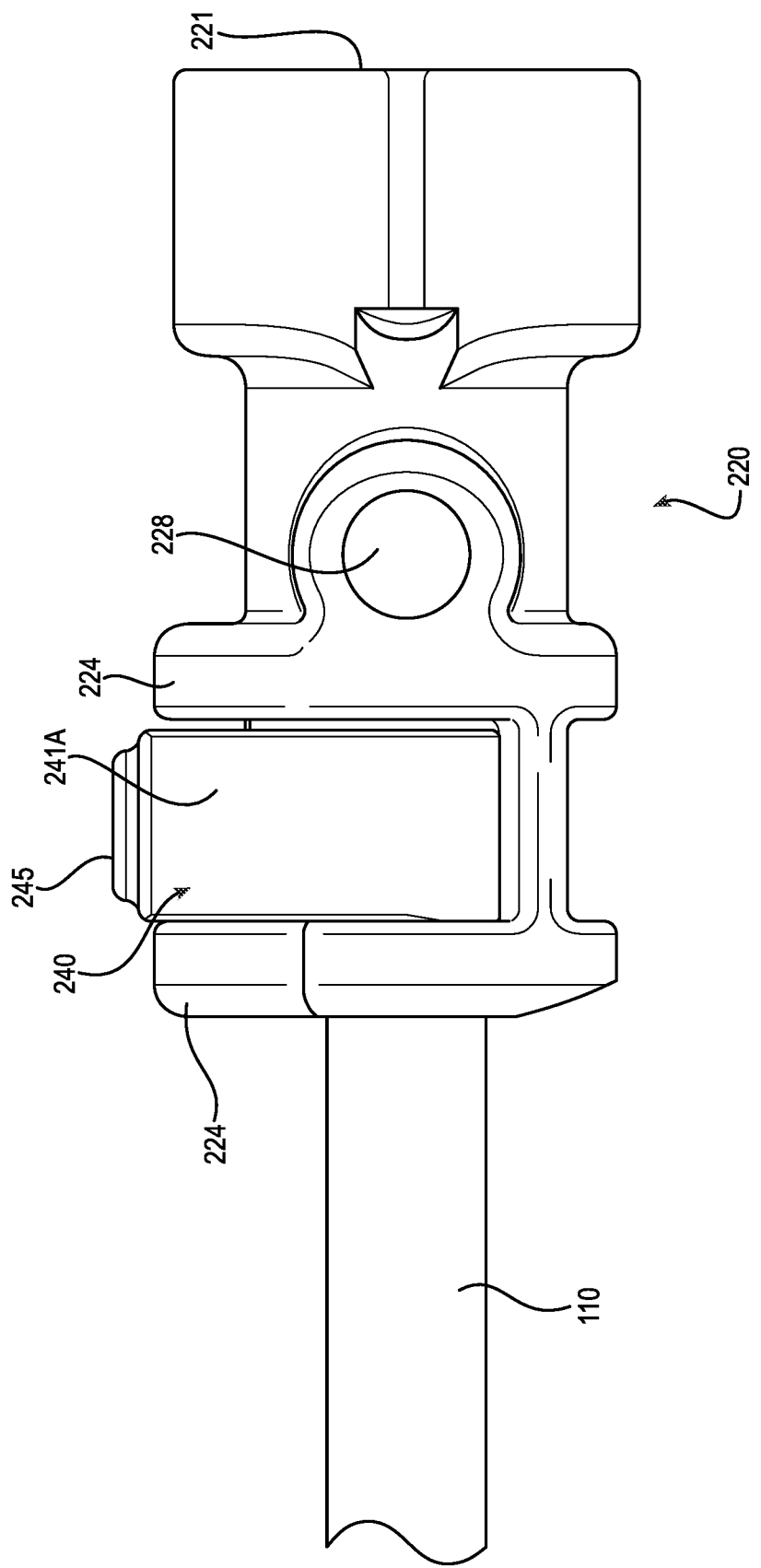
FIG. 16 is a side view of the male and female fittings of the quick-connect fitting, in accordance with an example of the disclosure.
Figure 17:
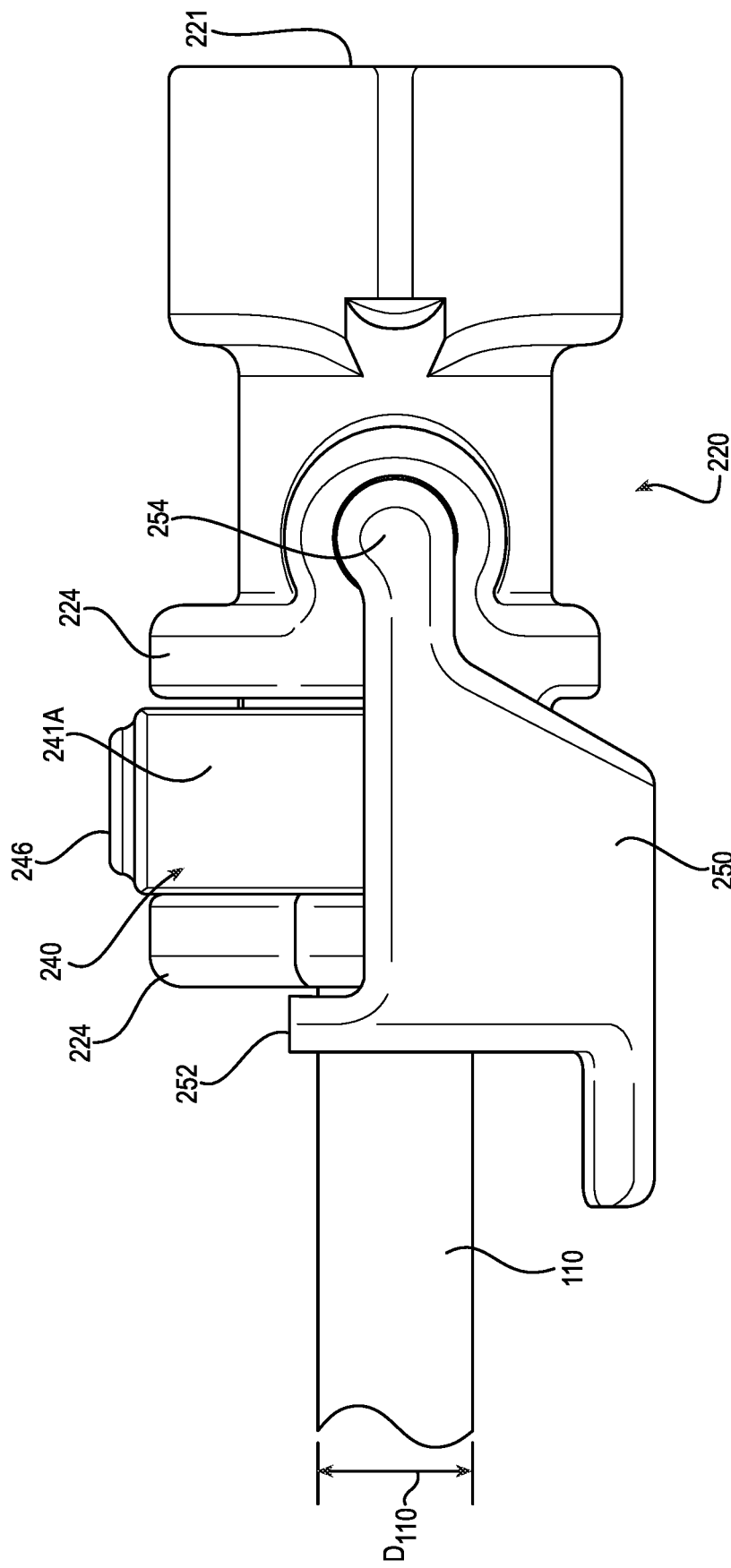
FIG. 17 is a side view of the quick-connect fitting of FIG. 16, in accordance with an example of the disclosure.

Returning to the structure of the female fitting 220. As illustrated by FIGS. 13-16 in various arrangements, the female fitting 220 comprises a saddle 224 formed by a pair of raised curbs extending from an exterior surface of the female fitting 220. The pair of raised curbs form a recess therebetween for receiving a seat 245 of the clip 240, as illustrated by FIGS. 13 and 16-17. The seat 245 of the clip 240 extends from one side of the female fitting 220 to an opposing side of the female fitting 220 such that two opposing legs 241A, 241B extend from the seat 245 into the female fitting 220 from an exterior of the female fitting 220. As illustrated by FIGS. 14-15, the female fitting 220 comprises a pair of opposing apertures 222A, 222B extending through opposing sidewalls of the female fitting 220 below the saddle 224 of the female fitting 220 where a top wall 223 is maintained at the saddle 224 between the two opposing apertures 222A, 222B. A ledge 244A, 244B extends adjacent the apertures 222A, 222B from the top wall 223 to the a base 225A, 225B of the aperture 222A, 222B for mating against and guiding the ledge 243A, 243B of the clip 240, as the clip 240 is positioned onto the female fitting 220.

Figure 20:
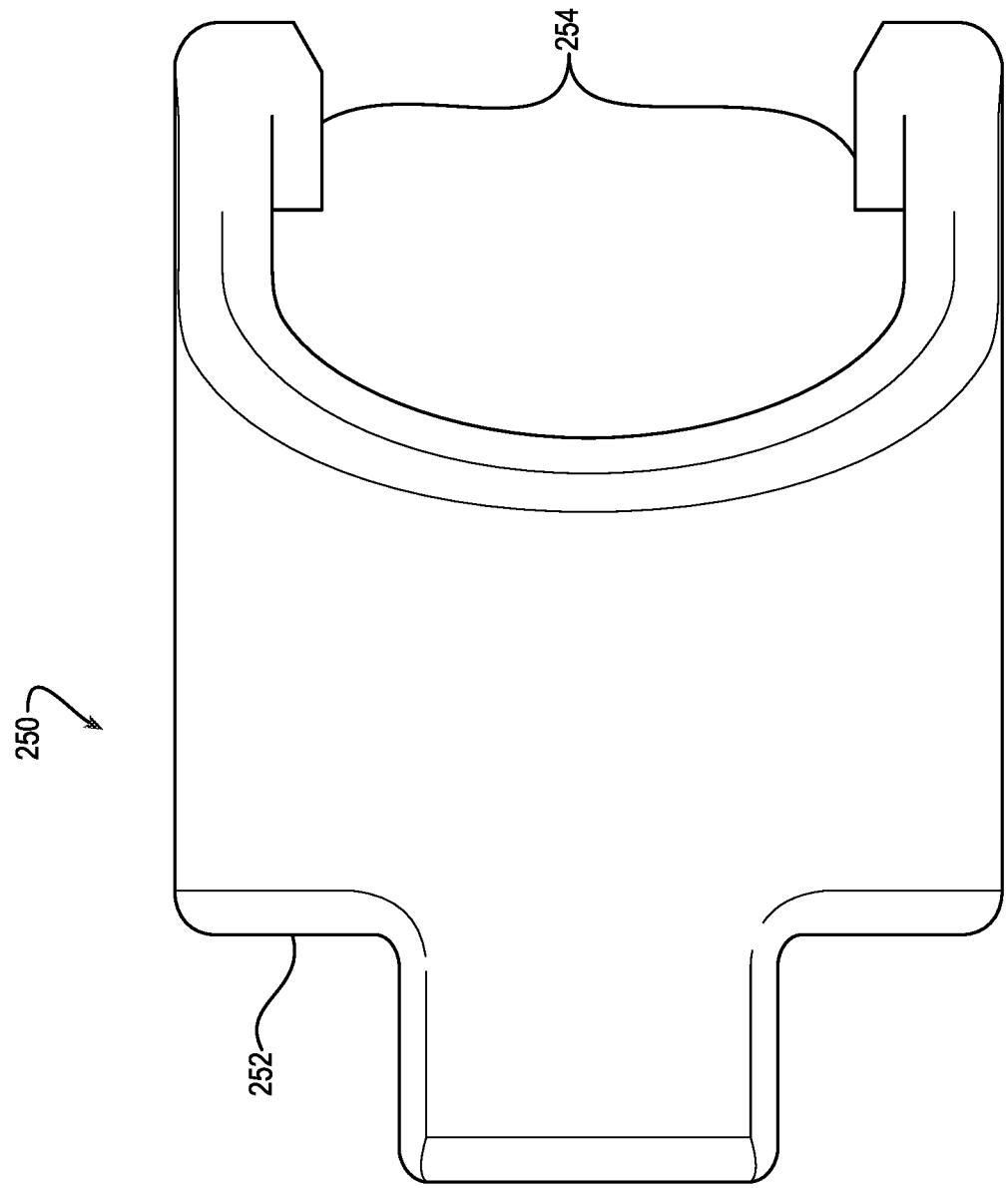
FIG. 20 is a top view of a pivotable clip, in accordance with an example of the disclosure.
Figure 21:
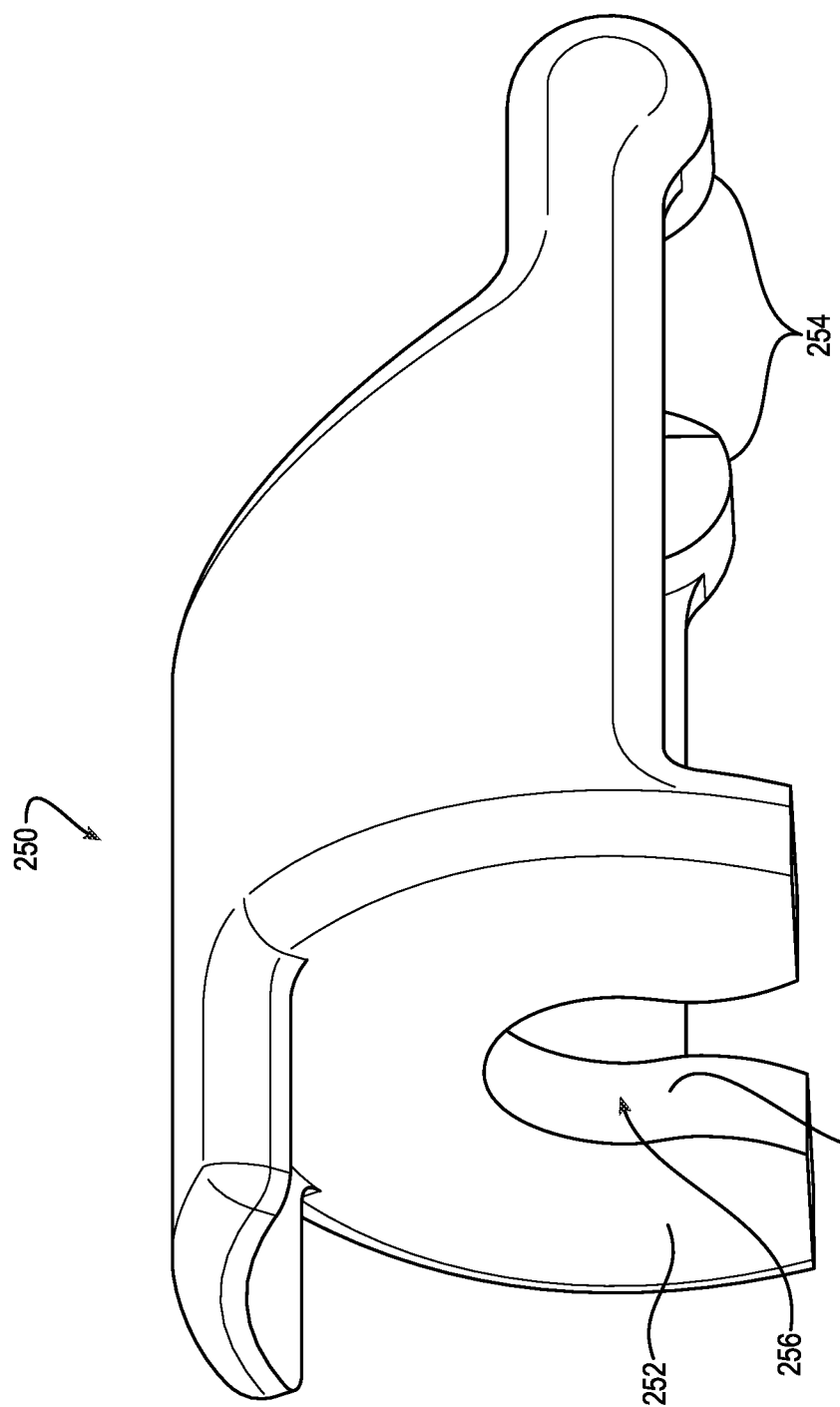
FIG. 21 is a perspective view of the pivotable clip of FIG. 20, in accordance with an example of the disclosure.

In the example shown in FIGS. 17, 20, and 21, the quick-connect fitting 200, as additionally described with respect to FIGS. 11-16, may additionally include a pivotable clip 250 to further secure the male fitting 130 (of FIG. 4) to the female fitting 220 when the male fitting 130 is positioned within the female fitting 220. The pivotable clip 250 is pivotable between a first, connected, position connecting the female fitting 220 to the male fitting 130 when the male fitting 130 is positioned within the female fitting 220, as shown in FIG. 17, and a second, open, position in which the male fitting 130 is removable from the female fitting 220, or the pivotable clip 250 is pivoted away from the male fitting 130 about the pivot recesses 228, as illustrated by FIGS. 12-16. With reference to FIGS. 17, 20 and 21, the pivotable clip 250 may include a pair of pivot pins 254 positioned to engage corresponding pivot recesses 228 in the sidewall 225 on opposing sides of the female fitting 220, as shown in in FIGS. 12-16. The pivotable clip 250 is pivotable about an axis transverse to the longitudinal direction of the female fitting 220.

As shown in FIGS. 20 and 21, the pivotable clip 250 includes an end wall 252 operable to retain the male fitting 130 connected to the female fitting 220. The end wall 252 has a tube-engaging aperture 256 to engage the first tube 110 (as illustrated by FIG. 17), the tube-engaging aperture 256 having an opening corresponding to the outside diameter of the first tube 110. The end wall 252 may be positioned such that the pivotable clip 250 will not move to the connected position unless the male fitting 130 (of FIG. 4) is fully engaged with the female fitting 220. To prevent the pivotable clip 250 from moving to an unfastened or disconnected position, the tube-engaging aperture 256 may interlock around the first tube 110 and/or female fitting 220. The tube-engaging aperture 256 may include a mouth for receiving the tube into the tube-engaging aperture 256, where the mouth has an opening smaller than the outer diameter Duo of the first tube 110 (as illustrated by FIG. 17). As shown in FIG. 17, the end wall 252 of the pivotable clip 250 acts to bias, or engage, the curb 138 of the male fitting 130 (as illustrated by FIG. 4), preventing the male fitting 130 from disconnecting from the female fitting 220. The male fitting 130 may further comprise additional curbs for receiving the pivotable clip 250, much like the curbs receive the clip 240, above.

In the example shown in FIG. 17, when the pivotable clip 250 is in the connected position, the pivotable clip 250 engages the first tube 110 at engagement location 139 adjacent the curb 138 (as illustrated by FIG. 4). For certain applications, the first tube 110 may tend to deform in cross-sectional shape when in a bended position, reducing the engagement between the pivotable clip 250 and the first tube 110. To inhibit cross-sectional deformation, the male fitting 130 may include additional curbs 138 encircling the first tube 110 adjacent the second tube 212 engagement location 139. Alternatively, additional curbs 138 may be wrapped around the tube or slid onto the tube and crimped or frictionally engaged to the tube to hold the curb 138 in position. In one embodiment, the curb 138 is crosslinked polyethylene having an inside diameter slightly smaller than the tube outside diameter, and where the shape memory property of crosslinked polyethylene retains the curb 138 onto the tube.

In one example, the pivotable clip 250 may engage and interlock with the cylindrical body when in the fastened position. Alternatively, the pivotable clip 250 may engage and interlock with a section of the cylindrical body and the first tube 110 when in the fastened position. Not only does the pivotable clip provide an additional connection between the male fitting 130, the first tube 110, the female fitting 220, and/or the second tube 212, or any combination thereof, but the pivotable clip 250 additionally secures the clip 240 about the female fitting 220 and male fitting 130 when in the connected position.

In another example, the pivotable clip 250 is pivotally connected to a male fitting 130 overmolded onto the first tube 110 (as illustrated by FIG. 4), the pivotable clip 250 is pivotable about an axis transverse to the longitudinal direction of the male fitting 130 to connect a female fitting 220 having a cylindrical cavity overmolded onto a second tube 212. In this example, the pivotable clip 250 may include pivot pins positioned to engage corresponding pivot recesses 228A, 228B in the outer wall of the male fitting 130 and operate analogous to the pivotable clip 250 described above but pivoting from the male fitting 130 and engaging the female fitting 220 or the second tube 212. As discussed above with reference to the male fitting 130, the second tube 212 may tend to deform in cross-sectional shape when in a bended position, reducing the engagement between the pivotable clip 250 and the tube. In this embodiment, to inhibit cross-sectional deformation, the female fitting 220 may include a curb encircling the second tube 212 adjacent a tube engagement location.

The clip 240 and/or the pivotable clip 250 may be made from a rigid or semi-rigid polymeric material such as polyacetal, nylon or polyamide, acrylonitrile butadiene styrene terpolymer, polystyrene, polycarbonate, polyvinyl chloride, polyethylene terephthalate polyester, or other polymeric material, as desired, for the application suitable for retaining the male fitting 130 in the cylindrical cavity 226 under the loading and environmental conditions of the desired application. In one example, the clip is glass-filled nylon.

Figure 22C:
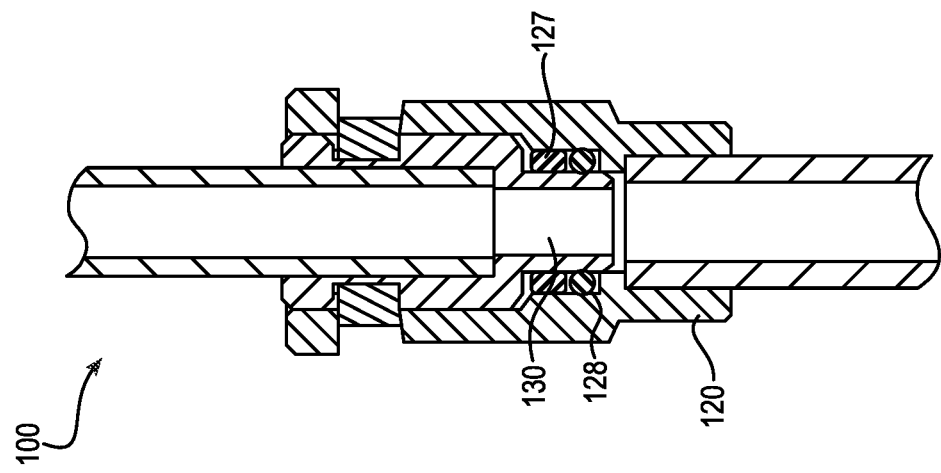
FIG. 22C is a cross section of a quick-connect fitting, in accordance with an example of the disclosure.
Figure 22B:
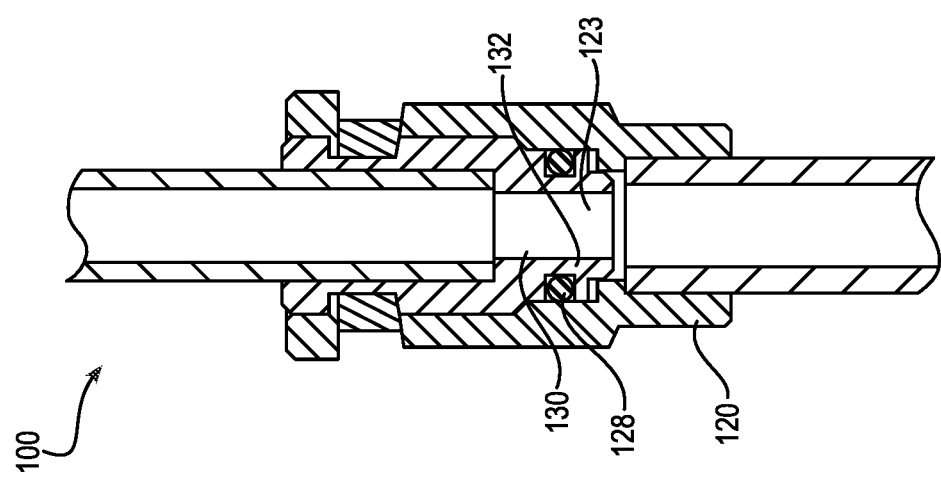
FIG. 22B is a cross section of a quick-connect fitting, in accordance with an example of the disclosure.
Figure 22A:
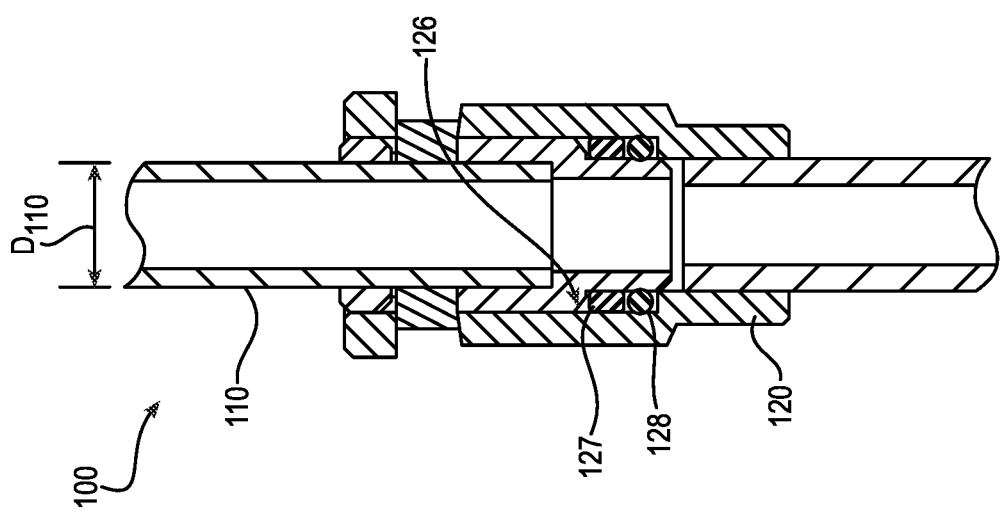
FIG. 22A is a cross section of a quick-connect fitting, in accordance with an example of the disclosure.

As shown by FIGS. 22A, the cylindrical cavity 126 of the female fitting 120 may include a retaining ring 127 retaining an O-ring 128. The O-ring 128 has an inside diameter corresponding to the outer diameter Duo of the first tube 110 in sealing engagement. The retaining ring 127 has a retaining ring inner diameter larger than the outer diameter Duo of the first tube 110 so that the tubular sealing element 132 may pass through the retaining ring 127 to engage the O-ring 128. The retaining ring 127 also has an outer diameter larger than an inside diameter of the cylindrical cavity 126 such that the retaining ring 127 is forcibly inserted into the cylindrical cavity 126 and retained by the shape memory property of the crosslinked polymer of the cylindrical cavity 126 and the interference between the retaining ring 127 and the cylindrical cavity 126. The shape memory property of the crosslinked polymer of the cylindrical cavity 126 may be used to hold the retaining ring in the cylindrical cavity 126 without any other locking or retaining features such as grooves, detents, interlocking features, adhesives or other retaining or locking features.

In another example shown by FIG. 22B, rather than using a retaining ring 127 to sealing element 132 of the male fitting 130. It is also contemplated that the inner diameter of the female fitting 120 could be reduced to accommodate a smaller male fitting 130. Alternatively, and as illustrated by FIG. 22C, instead of reducing the inner diameter of the female fitting 120 to accommodate a smaller male fitting 130, the dimensions of the female fitting 120 may be retained while a thicker retaining ring 127 and O-ring 128 are used to accommodate the difference in diameter. While explained with reference to quick-connect fitting 100 it is understood that the examples shown in FIG. 22A-22C could also be used with quick-connect fitting 200.

In some examples, a female fitting may be integral to a component such as a solenoid valve. Alternatively, the female fitting may be integral to any desired component, such as a component selected from the group consisting of valve, diverter, manifold, fixture, Y-connector, and T-connector. In some examples, the male fitting may be integral to any desired component, such as a component selected from the group consisting of valve, diverter, manifold, fixture, Y-connector, and T-connector, while the female fitting is provided to engage the integral male fitting. The integral male fitting may include a cylindrical body and a tubular sealing element extending longitudinally therefrom and positionable within the female fitting as discussed above with reference to male fitting.

As used in this application, the term "overmold" means the process of injection molding a second polymer over a first polymer, wherein the first and second polymers may or may not be the same. An overmold having a specific geometry may be necessary to attach a tube to a fitting, valve, another tube, a diverter, a manifold, a fixture, a T connector, a Y connector or other plumbing or appliance connection. In one embodiment, the composition of the overmolded polymer will be such that it will be capable of at least some melt fusion with the composition of the polymeric tube. There are several means by which this may be affected. One of the simplest procedures is to ensure that at least a component of the polymeric tube and that of the overmolded polymer is the same. Alternatively, it would be possible to ensure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to state this would be to indicate that at least a portion of the polymer compositions of the polymeric tube and the overmolded polymer are miscible. In contrast, the chemical composition of the polymers may be relatively incompatible, thereby not resulting in a material-to-material bond after the injection overmolding process.

In the above examples, the waterway connection does not include a spnng for operation but, instead, relies on the material properties of the components. In one example of this disclosure, the features of the present disclosure are made from high density polyethylene which are crosslinked (e.g., PEX). PEX contains crosslinked bonds in the polymer structure changing the thermoplastic into a thermoset. Crosslinking may be accomplished during or after the molding of the part. The required degree of crosslinking for crosslinking polyethylene tubing, according to ASTM Standard F 876, is between 65-89%. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

The polymers for the polymeric male fitting, the polymeric female fitting, and/or polymeric clips may be high density polyethylene, which is subsequently crosslinked by the application of an electron beam, although other modes of crosslinking are envisioned to be within the scope of this invention. In another example, the polymers for the polymeric male fitting, the polymeric female fitting, and/or polymeric clips will be glass-filled high density polyethylene, which is subsequently crosslinked by application of an electron beam or other crosslinking modes The tubes may also be crosslinked high density polyethylene. Crosslinking imparts shape memory properties to polymers. Shape memory materials have the ability to return from a deformed state (e.g., temporary shape) to their original crosslinked shape (e.g., permanent shape), typically induced by an external stimulus or trigger, such as a temperature change. Alternatively, or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature induces the shape memory effect providing internal forces urging the crosslinked polymer toward its permanent or crosslinked shape. Alternatively, or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 134° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked m an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made from stearyl acrylate, methacrylate, and N,N'-methylenebisacrylamide as a crosslinker.

Additionally, shape memory polymers include polyurethanes, polyurethanes with ionic or mesogenic components, block copolymers consisting of polyethylene terephthalate and polyethylene oxide, block copolymers containing polystyrene and poly(1,4-butadiene), and an ABA triblock copolymer made from poly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

The invention claimed is:

1. A waterway connection assembly comprising:
   a male fitting comprising a recess;
   a female fitting comprising a saddle and a first aperture and a second aperture within opposing sidewalls of the female fitting;
   a clip comprising a first leg and a second leg extending from a seat wherein the first leg has a first tab extending in an axial direction;
   wherein a base of the first leg has a first tapered surface engageable with a base of the first aperture and the second leg has a second tapered surface engageable with a base of the second aperture and wherein the first aperture extends axially to form a first locking recess;
   wherein the clip is moveably mountable on the female fitting with the clip being moveable between a first position wherein the male fitting is secured within the female fitting and second position wherein the male fitting is released relative to the female fitting;
   wherein, in the first position, a gap is defined between the seat of the clip and the saddle of the female fitting, a portion of the first leg extends through the first aperture of the female fitting into the recess of the male fitting and a portion of the second leg extends through the second aperture of the female fitting into the recess of the male fitting to thereby secure the male fitting within the female fitting, and the first tab is disposed within the first locking recess to secure the clip on the female fitting; and
   the clip is moveable to the second position by forcibly biasing the clip into a position where the clip is fully seated into the saddle of the female fitting, the base of the first aperture biasing the first tapered surface radially outwardly and the base of the second aperture biasing the second tapered surface radially outwardly whereby the first leg and the second leg are biased out of the recess of the male fitting thereby releasing the male fitting from the female fitting.

2. The assembly of claim 1, where the base of the first aperture extends into the first locking recess and the first tapered surface of the first leg extends onto the first tab.

3. The assembly of claim 1, wherein the first tab is maintained within the first locking recess when the clip is in the second position.

4. The assembly of claim 1, wherein the second leg has a second tab extending in the axial direction, the second aperture extends axially to form a second locking recess and, in the first position, the second tab is disposed within the second locking recess to secure the clip on the female fitting.

5. The assembly of claim 4, where the base of the first aperture extends into the first locking recess and the first tapered surface of the first leg extends onto the first tab; and the base of the second aperture extends into the second locking recess and the second tapered surface of the second leg extends onto the second tab.

6. The assembly of claim 4, wherein the first tab is maintained within the first locking recess and the second tab is maintained within the second locking recess when the clip is in the second position.

7. The assembly of claim 4, where the first tab is configured to travel about an exterior of the first sidewall of the opposing sidewalls of the female fitting and the second tab is configured to travel about an exterior of the second sidewall of the opposing sidewalls of the female fitting as the first leg and the second leg are moved into position overtop the respective first aperture and the second aperture where the first tab enters into the first locking recess and the second tab enters into the second locking recess.

8. The assembly of claim 4, where the clip is u-shaped and symmetrical about a plane dividing the first leg from the second leg.

9. A waterway connection assembly comprising:
a male fitting comprising a first raised curb and a second raised curb defining a recess therebetween;
a female fitting comprising a saddle and a first aperture and a second aperture within opposing sidewalls of the female fitting;
a clip comprising a first leg and a second leg extending from a seat;
wherein the clip is moveably mountable on the female fitting with the clip being moveable between a first position wherein the male fitting is secured within the female fitting and second position wherein the male fitting is released relative to the female fitting;
wherein, in the first position, a gap is defined between the seat of the clip and the saddle of the female fitting, a portion of the first leg extends through the first aperture of the female fitting into the recess of the male fitting and a portion of the second leg extends through the second aperture of the female fitting into the recess of the male fitting to thereby secure the male fitting within the female fitting
a first retaining extension projecting axially from a sidewall of the first leg and a second retaining extension projecting axially from a sidewall of the second leg, the first retaining extension being disposed radially inwardly of the female fitting and extending in an axial direction toward the second raised curb when the sidewall of the first leg engages a face of the first aperture and the second retaining extension being disposed radially inwardly of the female fitting and extending in an axial direction toward the second raised curb when the sidewall of the second leg engages a face of the second aperture; and
wherein, when the sidewall of the first leg engages the face of the first aperture, an opposing surface of the first leg engages the first raised curb and, when the sidewall of the second leg engages the face of the second aperture, an opposing surface of the second leg engages the first raised curb.

10. The assembly of claim 9 wherein the first leg has a first tab extending in a first axial direction, the first tab being configured to travel about an exterior of the female fitting as the first leg and the second leg are moved into position overtop the respective first aperture and the second aperture where the first tab enters into a first locking recess extending into the body of the female fitting; and
wherein the first retaining extension and the second retaining extension both extend in a second axial direction opposite to the first axial direction.

11. The assembly of claim 10 wherein the clip further comprises a second tab of the second leg extending from the second leg in the first axial direction wherein the second tab is configured to travel about an exterior of the female fitting as the first leg and the second leg are moved into position overtop the respective first aperture and the second aperture where the second tab enters into a second locking recess extending into the body of the female fitting.

12. A waterway connection assembly comprising:
a male fitting comprising a recess;
a female fitting comprising a saddle and a first aperture and a second aperture within opposing sidewalls of the female fitting;
a clip comprising a first leg and a second leg extending from a seat;
wherein a base of the first leg has a first tapered surface engageable with a base of the first aperture and the second leg has a second tapered surface engageable with a base of the second aperture;
wherein the clip is moveable between a first position wherein the male fitting is secured within the female fitting and second position wherein the male fitting is released relative to the female fitting;
wherein, in the first position, a gap is defined between the seat of the clip and the saddle of the female fitting, a portion of the first leg extends through the first aperture of the female fitting into the recess of the male fitting and a portion of the second leg extends through the second aperture of the female fitting into the recess of the male fitting to thereby secure the male fitting within the female fitting;
the clip being moveable to the second position by forcibly biasing the clip into a position where the clip is fully seated into the saddle of the female fitting, the base of the first aperture biasing the first tapered surface radially outwardly and the base of the second aperture biasing the second tapered surface radially outwardly whereby the first leg and the second leg are biased out of the recess of the male fitting thereby releasing the male fitting from the female fitting; and
a second clip pivotally mounted on the female fitting and being engageable with the male fitting when the male fitting is disposed within the female fitting to thereby secure the male fitting to the female fitting.

13. The assembly of claim 12 wherein the second clip includes a pair of pivot pins pivotally disposed in a pair of pivot recesses defined by the female fitting.

14. A waterway connection assembly comprising:
a male fitting overmolded onto a tube and defining a recess;
a female fitting comprising a saddle and a first aperture and a second aperture within opposing sidewalls of the female fitting;
a clip comprising a first leg and a second leg extending from a seat;
wherein a base of the first leg has a first tapered surface engageable with a base of the first aperture and the second leg has a second tapered surface engageable with a base of the second aperture;
wherein the clip is moveably mountable on the female fitting with the clip being moveable between a first position wherein the male fitting is secured within the female fitting and second position wherein the male fitting is released relative to the female fitting;

wherein, in the first position, a gap is defined between the seat of the clip and the saddle of the female fitting, a portion of the first leg extends through the first aperture of the female fitting into the recess of the male fitting and a portion of the second leg extends through the second aperture of the female fitting into the recess of the male fitting to thereby secure the male fitting within the female fitting; and the clip being moveable to the second position by forcibly biasing the clip into a position where the clip is fully seated into the saddle of the female fitting, the base of the first aperture biasing the first tapered surface radially outwardly and the base of the second aperture biasing the second tapered surface radially outwardly whereby the first leg and the second leg are biased out of the recess of the male fitting thereby releasing the male fitting from the female fitting.

15. The assembly of claim 14 wherein the first leg has a first tab extending in an axial direction, the first tab being configured to travel about an exterior of the female fitting as the first leg and the second leg are moved into position overtop the respective first aperture and the second aperture where the first tab enters into a first locking recess extending into the body of the female fitting.

16. The assembly of claim 15 wherein the first locking recess extends axially from the first aperture.

17. The assembly of claim 15 wherein the clip further comprises a second tab of the second leg extending from the second leg in an axial direction wherein the second tab is configured to travel about an exterior of the female fitting as the first leg and the second leg are moved into position overtop the respective first aperture and the second aperture where the second tab enters into a second locking recess extending into the body of the female fitting.

18. The assembly of claim 17 wherein the first locking recess extends axially from the first aperture and the second locking recess extends axially from the second aperture.

* * * * *